US012065828B2

(12) United States Patent
Pervan et al.

(10) Patent No.: US 12,065,828 B2
(45) Date of Patent: Aug. 20, 2024

(54) MECHANICAL LOCKING SYSTEM FOR FLOORBOARDS

(71) Applicant: Välinge Innovation AB, Viken (SE)

(72) Inventors: Darko Pervan, Viken (SE); Agne Palsson, Hasslarp (SE)

(73) Assignee: Välinge Innovation AB, Viken (SE)

( * ) Notice: Subject to any disclaimer, the term of this patent is extended or adjusted under 35 U.S.C. 154(b) by 0 days.

(21) Appl. No.: 17/932,902

(22) Filed: Sep. 16, 2022

(65) Prior Publication Data

US 2023/0011237 A1 Jan. 12, 2023

Related U.S. Application Data

(63) Continuation of application No. 16/883,071, filed on May 26, 2020, now Pat. No. 11,479,970, which is a (Continued)

(30) Foreign Application Priority Data

Jun. 19, 2012 (SE) .................................... 1250656-4
Jun. 26, 2012 (SE) .................................... 1250691-1
Jan. 11, 2013 (SE) .................................... 1350027-7

(51) Int. Cl.
*E04F 15/02* (2006.01)
*B27F 1/02* (2006.01)

(Continued)

(52) U.S. Cl.
CPC .................. *E04B 5/02* (2013.01); *B27F 1/02* (2013.01); *B27M 3/04* (2013.01);

(Continued)

(58) Field of Classification Search
CPC .............. E04F 13/0889; E04F 13/0894; E04F 15/02038; E04F 2201/0153;

(Continued)

(56) References Cited

U.S. PATENT DOCUMENTS 2,110,728 A 3/1938 Hoggatt
2,430,200 A 11/1947 Wilson (Continued)

FOREIGN PATENT DOCUMENTS

CN 1489511 A 4/2004
CN 101391427 A 3/2009

(Continued)

OTHER PUBLICATIONS

Extended European Search Report issued in EP Application No. 13 807 818.3, dated Dec. 22, 2015, European Patent Office, Munich, DE, 9 pages.

(Continued)

*Primary Examiner* — Kyle J. Walraed-Sullivan
(74) *Attorney, Agent, or Firm* — Boone IP Law

(57) ABSTRACT

Building panels, especially floor panels are shown, which are provided with a locking system that is configured to lock the adjacent edges by angling and that have a tongue and a strip on the same edge, and a method to divide a board and produce such building panels. A method for dividing a floor element, into a first floor panel and a second floor panel, said floor element including a core provided with a decorative surface layer and a balancing layer, wherein the method includes the step of forming, through the balancing layer or the decorative surface layer, a second groove by displacing the floor element past a fixed tool.

19 Claims, 11 Drawing Sheets

Related U.S. Application Data continuation of application No. 15/602,345, filed on May 23, 2017, now Pat. No. 10,697,175, which is a continuation of application No. 13/920,647, filed on Jun. 18, 2013, now Pat. No. 9,816,270.

(60) Provisional application No. 61/661,645, filed on Jun. 19, 2012.

(51) Int. Cl.
*B27M 3/04* (2006.01)
*E04B 5/02* (2006.01)

(52) U.S. Cl.
CPC . *E04F 15/02038* (2013.01); *E04F 2201/0115* (2013.01); *E04F 2201/0153* (2013.01); *E04F 2201/025* (2013.01); *Y10T 29/49815* (2015.01); *Y10T 29/49817* (2015.01); *Y10T 29/49819* (2015.01)

(58) Field of Classification Search
CPC .......... E04F 2201/0184; E04F 2201/02; E04F 2201/023; E04F 2201/027; E04F 2201/03; E04F 2201/043; E04F 2201/0169; E04F 2201/0107; E04F 2201/0115; E04F 2201/0123; E04F 2201/013; E04F 2201/0161; E04F 2201/0176; E04F 2201/0192; E04F 2201/025; E04F 2201/021; E04F 2201/026; E04F 2201/044; E04F 2201/0523; E04F 2201/05; E04F 2201/0511; E04F 2201/0517; E04F 2201/0529; E04F 2201/0535; E04F 2201/0541; E04F 2201/0547; E04F 2201/0552; E04F 2201/0558
See application file for complete search history.

(56) References Cited

U.S. PATENT DOCUMENTS 3,187,612 A 6/1965 Hervey
3,656,220 A 4/1972 Dupuis
3,731,445 A 5/1973 Hoffmann et al.
4,083,390 A 4/1978 Ingham
4,169,688 A 10/1979 Toshio
4,426,820 A 1/1984 Terbrack et al.
4,495,733 A 1/1985 Boerner et al.
4,498,361 A 2/1985 Grace
4,512,131 A 4/1985 Laramore
4,564,320 A 1/1986 Roseliep
4,599,841 A 7/1986 Haid
4,819,932 A 4/1989 Trotter, Jr.
5,135,597 A 8/1992 Barker
5,295,341 A 3/1994 Kajiwara
5,352,068 A 10/1994 Roseliep
5,577,357 A 11/1996 Civelli
5,860,267 A 1/1999 Pervan
5,950,389 A 9/1999 Porter
6,006,486 A 12/1999 Moriau et al.
6,182,410 B1 2/2001 Pervan
6,203,653 B1 3/2001 Seidner
6,247,285 B1 6/2001 Moebus
6,254,301 B1 7/2001 Hatch
6,295,779 B1 10/2001 Canfield
6,332,733 B1 12/2001 Hamberger et al.
6,339,908 B1 1/2002 Chuang
6,358,352 B1 3/2002 Schmidt
6,418,683 B1 7/2002 Martensson et al.
6,450,235 B1 9/2002 Lee
6,490,836 B1 12/2002 Moriau et al.
6,497,079 B1 12/2002 Pletzer et al.
6,576,079 B1 6/2003 Kai
6,584,747 B2 7/2003 Kettler et al.
6,591,568 B1 7/2003 Joergen
6,681,820 B2 1/2004 Olofsson
6,729,091 B1 5/2004 Martensson
6,763,643 B1 7/2004 Goeran
6,802,166 B1 10/2004 Gerhard
6,854,235 B2 2/2005 Martensson
6,880,307 B2 4/2005 Schwitte et al.
7,040,068 B2 5/2006 Moriau et al.
7,051,486 B2 5/2006 Pervan
7,127,860 B2 10/2006 Pervan et al.
7,171,791 B2 2/2007 Pervan
7,603,826 B1 10/2009 Moebus
7,637,068 B2 12/2009 Pervan
7,644,553 B2 * 1/2010 Knauseder ................. C09J 5/04 52/592.1
7,677,005 B2 3/2010 Pervan
7,757,452 B2 7/2010 Pervan
7,762,293 B2 7/2010 Pervan
7,841,150 B2 11/2010 Pervan
7,874,118 B2 * 1/2011 Schitter ................... B44C 5/043 52/581
8,495,849 B2 7/2013 Pervan
8,511,031 B2 8/2013 Bergelin et al.
8,544,233 B2 * 10/2013 Palsson ................... E04F 15/02 52/578
8,631,622 B2 1/2014 Baert et al.
8,733,410 B2 5/2014 Pervan
8,763,340 B2 * 7/2014 Pervan .................... E04F 15/02 52/582.2
8,931,174 B2 1/2015 Pervan et al.
9,314,888 B2 4/2016 Pervan et al.
9,719,542 B2 8/2017 Cappelle et al.
9,816,270 B2 11/2017 Pervan et al.
10,279,404 B2 5/2019 Pervan et al.
10,378,217 B2 8/2019 Pervan
10,500,684 B2 12/2019 Pervan et al.
10,697,175 B2 6/2020 Pervan et al.
10,801,213 B2 10/2020 Nilsson
10,941,578 B2 3/2021 Nilsson
11,479,970 B2 10/2022 Pervan et al.
2001/0015042 A1 * 8/2001 Ballard ................... E04F 15/10 52/489.1
2002/0025232 A1 2/2002 Miller
2002/0057942 A1 5/2002 Hamberger et al.
2002/0189183 A1 * 12/2002 Ricciardelli ............ B32B 27/06 52/311.1
2003/0037504 A1 2/2003 Schwitte et al.
2003/0140478 A1 7/2003 Olofsson
2003/0154681 A1 8/2003 Pletzer et al.
2003/0180091 A1 9/2003 Stridsman
2004/0016196 A1 1/2004 Pervan
2004/0031225 A1 * 2/2004 Fowler .................... E04F 15/02 52/592.1
2004/0035078 A1 2/2004 Pervan
2004/0206036 A1 10/2004 Pervan
2004/0211143 A1 10/2004 Hanning
2004/0250492 A1 12/2004 Becker
2004/0250914 A1 12/2004 Olofsson
2005/0016107 A1 1/2005 Rosenthal et al.
2005/0034405 A1 2/2005 Pervan
2005/0160694 A1 7/2005 Pervan
2005/0166514 A1 8/2005 Pervan
2005/0247000 A1 * 11/2005 Zhu ......................... E04F 15/02 52/588.1
2005/0252130 A1 11/2005 Martensson
2006/0070333 A1 4/2006 Pervan
2007/0028547 A1 2/2007 Grafenauer et al.
2007/0175148 A1 8/2007 Bergelin et al.
2007/0245663 A1 * 10/2007 Hahn ...................... E04F 15/04 52/506.01
2008/0041008 A1 2/2008 Pervan
2008/0110125 A1 5/2008 Pervan
2008/0134607 A1 6/2008 Pervan et al.
2008/0168737 A1 7/2008 Pervan
2008/0172856 A1 7/2008 Brouckaert et al.
2008/0216434 A1 9/2008 Pervan
2008/0216920 A1 9/2008 Pervan

(56) References Cited

U.S. PATENT DOCUMENTS

| | | | | |
|---|---|---|---|---|
| 2009/0038254 | A1* | 2/2009 | Steele | E04F 15/02 52/745.05 |
| 2009/0049792 | A1 | 2/2009 | Cappelle et al. | |
| 2009/0064624 | A1 | 3/2009 | Sokol | |
| 2009/0101236 | A1 | 4/2009 | Boucke | |
| 2009/0133353 | A1 | 5/2009 | Pervan et al. | |
| 2009/0223162 | A1* | 9/2009 | Chen | E04F 15/02 52/588.1 |
| 2009/0223600 | A1 | 9/2009 | Tappan | |
| 2009/0260313 | A1 | 10/2009 | Segaert | |
| 2010/0043333 | A1* | 2/2010 | Hannig | F16B 5/0056 52/582.2 |
| 2010/0170189 | A1 | 7/2010 | Schulte | |
| 2011/0023302 | A1 | 2/2011 | Pervan et al. | |
| 2011/0023303 | A1 | 2/2011 | Pervan et al. | |
| 2011/0030303 | A1 | 2/2011 | Pervan et al. | |
| 2011/0138722 | A1 | 6/2011 | Hannig | |
| 2011/0209430 | A1 | 9/2011 | Pervan | |
| 2011/0225921 | A1* | 9/2011 | Schulte | E04F 15/02 52/745.05 |
| 2012/0066996 | A1* | 3/2012 | Konstanczak | E04F 13/08 52/588.1 |
| 2012/0096801 | A1* | 4/2012 | Cappelle | E04F 15/02038 52/592.1 |
| 2012/0124932 | A1 | 5/2012 | Schulte et al. | |
| 2012/0174521 | A1 | 7/2012 | Schulte | |
| 2013/0097959 | A1* | 4/2013 | Michel | E04C 2/30 29/557 |
| 2013/0111837 | A1* | 5/2013 | Devos | E04C 2/38 52/309.1 |
| 2013/0152500 | A1 | 6/2013 | Engstroem | |
| 2013/0192158 | A1* | 8/2013 | Cappelle | E04F 15/02033 52/588.1 |
| 2013/0212971 | A1 | 8/2013 | Cordeiro | |
| 2013/0263454 | A1 | 10/2013 | Boo et al. | |
| 2013/0263547 | A1 | 10/2013 | Boo | |
| 2013/0276398 | A1 | 10/2013 | Hannig | |
| 2013/0309441 | A1* | 11/2013 | Hannig | E04F 15/02038 29/428 |
| 2013/0333182 | A1 | 12/2013 | Pervan et al. | |
| 2014/0033633 | A1 | 2/2014 | Kell | |
| 2014/0223852 | A1 | 8/2014 | Pervan | |
| 2015/0107079 | A1 | 4/2015 | Pervan et al. | |
| 2015/0240500 | A1* | 8/2015 | Stevens, Jr. | E04F 15/105 52/588.1 |
| 2015/0267419 | A1* | 9/2015 | Darko | E04F 15/02022 52/588.1 |
| 2016/0221212 | A1 | 8/2016 | Pervan et al. | |
| 2017/0009460 | A1* | 1/2017 | Yau | E04F 15/02038 |
| 2017/0254076 | A1 | 9/2017 | Pervan et al. | |
| 2019/0211568 | A1 | 7/2019 | Nilsson | |
| 2019/0262915 | A1 | 8/2019 | Pervan et al. | |
| 2020/0181923 | A1 | 6/2020 | Quist et al. | |
| 2020/0263439 | A1 | 8/2020 | Nilsson | |
| 2020/0340254 | A1 | 10/2020 | De Rick | |
| 2021/0087829 | A1 | 3/2021 | Ylikangas et al. | |
| 2021/0310256 | A1 | 10/2021 | Boo | |
| 2022/0042320 | A1 | 2/2022 | Pervan | |

FOREIGN PATENT DOCUMENTS

| | | | |
|---|---|---|---|
| DE | 0138992 | C | 2/1903 |
| DE | 2159042 | A1 | 6/1973 |
| DE | 2337254 | A1 | 2/1975 |
| DE | 3343601 | A1 | 6/1985 |
| DE | 4215273 | A1 | 11/1993 |
| DE | 4242530 | A1 | 6/1994 |
| DE | 19601322 | A1 | 5/1997 |
| DE | 20002744 | U1 | 8/2000 |
| DE | 10048679 | A1 | 12/2001 |
| DE | 0142293 | C | 7/2003 |
| DE | 10241769 | B3 | 4/2004 |
| DE | 102010024513 | A1 | 12/2011 |
| DE | 102011055949 | A1 | 6/2013 |
| EP | 1048423 | A2 | 11/2000 |
| EP | 1120515 | A1 | 8/2001 |
| EP | 1146182 | A2 | 10/2001 |
| EP | 1349995 | A1 | 10/2003 |
| EP | 1440214 | A1 | 7/2004 |
| EP | 1754582 | A1 | 2/2007 |
| EP | 1851020 | A1 | 11/2007 |
| FR | 2810060 | A1 | 12/2001 |
| JP | 06-146553 | A | 5/1994 |
| PL | 197416 | B1 | 3/2008 |
| WO | 94/26999 | A1 | 11/1994 |
| WO | 96/27721 | A1 | 9/1996 |
| WO | 97/47834 | A1 | 12/1997 |
| WO | 99/66151 | A1 | 12/1999 |
| WO | 99/66152 | A1 | 12/1999 |
| WO | 00/20705 | A1 | 4/2000 |
| WO | 00/20706 | A1 | 4/2000 |
| WO | 00/47841 | A1 | 8/2000 |
| WO | 01/07729 | A1 | 2/2001 |
| WO | 01/48331 | A1 | 7/2001 |
| WO | 01/51732 | A1 | 7/2001 |
| WO | 01/53628 | A1 | 7/2001 |
| WO | 01/66876 | A1 | 9/2001 |
| WO | 01/75247 | A1 | 10/2001 |
| WO | 01/98604 | A1 | 12/2001 |
| WO | 02/55809 | A1 | 7/2002 |
| WO | 02/55810 | A1 | 7/2002 |
| WO | 02/60691 | A1 | 8/2002 |
| WO | 03/12224 | A1 | 2/2003 |
| WO | 03/16654 | A1 | 2/2003 |
| WO | 03/69094 | A1 | 8/2003 |
| WO | 03/83234 | A1 | 10/2003 |
| WO | 2004/079130 | A1 | 9/2004 |
| WO | 2004/085765 | A1 | 10/2004 |
| WO | 2005/068747 | A1 | 7/2005 |
| WO | 2006/043893 | A1 | 4/2006 |
| WO | 2006/090287 | A1 | 8/2006 |
| WO | 2006/103565 | A2 | 10/2006 |
| WO | 2006/117229 | A1 | 11/2006 |
| WO | 2007/015669 | A2 | 2/2007 |
| WO | 2007/019957 | A1 | 2/2007 |
| WO | 2008/004960 | A2 | 1/2008 |
| WO | 2008/064692 | A1 | 6/2008 |
| WO | 2009/016446 | A2 | 2/2009 |
| WO | 2009/020949 | A1 | 2/2009 |
| WO | 2009/116926 | A1 | 9/2009 |
| WO | 2010/015138 | A1 | 2/2010 |
| WO | 2010/048749 | A1 | 5/2010 |
| WO | 2014/108129 | A1 | 7/2014 |

OTHER PUBLICATIONS

Extended European Search Report issued in EP Application No. 17171195.5, dated Sep. 18, 2017, European Patent Office, Munich, DE, 10 pages.

Gronlund, Anders, Trabearbetning, 1986, ISBN 91-970513-2-2, pp. 16-23, published by Institutet for Trateknisk Forskning, Stockholm, Sweden, with Summary Translation.

International Search Report issued in PCT/SE2013/050718, dated Oct. 3, 2013, 6 pages, ISA/SE, Patent-och registreringsverket, Stockholm, SE.

Laminate Flooring Tips (http://flooring.lifetips.com/cat/61734/laminate-flooring-tips/index.html- ). Copyright 2000. 12 pages.

Pervan, Darko: VA073a Zip Loc, Ip.com Journal, Ip.com Inc., West Henrietta, NY, US, Sep. 13, 2011, XP013144910, ISSN: 1533-0001, 36 pages.

Swedish Office Action issued in SE 1250656-4, dated Jan. 17, 2013, PRV, Stockholm, SE, 7 pages.

What is Broaching Used for?, http://www.wisegeek.com/what-is-broaching-used-for.htm, 1 page.

* cited by examiner

KNOWN TECHNOLOGY

MECHANICAL LOCKING SYSTEM FOR FLOORBOARDS

CROSS REFERENCE TO RELATED APPLICATIONS

The present application is a continuation of U.S. application Ser. No. 16/883,071, filed on May 26, 2020, which is a continuation of U.S. application Ser. No. 15/602,345, filed on May 23, 2017, which is a continuation of U.S. application Ser. No. 13/920,647, filed on Jun. 18, 2013, now U.S. Pat. No. 9,816,270, which claims priority to U.S. Provisional Application No. 61/661,645, filed on Jun. 19, 2012, and claims the benefit of Swedish Application No. 1250656-4, filed on 19 Jun. 2012, Swedish Application No. 1250691-1, filed on 26 Jun. 2012, and Swedish Application No. 1350027-7, filed on 11 Jan. 2013. The entire contents of each of U.S. application Ser. No. 16/883,071, U.S. application Ser. No. 15/602,345, U.S. application Ser. No. 13/920,647, U.S. Provisional Application No. 61/661,645, Swedish Application No. 1250656-4, Swedish Application No. 1250691-1, and Swedish Application No. 1350027-7 are hereby incorporated herein by reference in their entirety.

TECHNICAL FIELD

Embodiments of the invention generally relate to the field of mechanical locking systems for building panels, especially floorboards. Embodiments of the invention relate to floorboards provided with such locking systems and methods for making floorboards with such locking systems. More specifically, embodiments of the invention relate above all to floors of the type having a core and a decorative surface layer on the upper side of the core.

FIELD OF APPLICATION OF THE INVENTION

Embodiments of the present invention are particularly suitable for use in floating floors, which are formed of floorboards which are joined mechanically with a locking system made in one piece with the core and are made up of one or more upper layers of veneer, decorative laminate or decorative plastic material, an intermediate core of wood-fibre-based material or plastic material and preferably a lower balancing layer on the rear side of the core, and are manufactured by sawing large boards into several panels. The following description of known technique, problems of known systems and objects and features of embodiments of the invention will therefore, as a non-restrictive example, be aimed above all at this field of application and in particular to laminate flooring formed as rectangular floorboards intended to be mechanically joined on both long sides and short sides. However, it should be emphasized that the invention may be used in any floorboards or building panels, which are intended to be locked together on two adjacent edges horizontally and vertically with a mechanical locking system that allows locking, preferably by an angling motion. Embodiments of the invention may thus also be applicable to, for instance, solid wooden floors, parquet floors with a core of wood lamellas or wood-fibre-based material and the like which are made as separate floor panels, floors with a printed and preferably also varnished surface and the like. Embodiments of the invention may also be used for joining building panels, for instance, of wall panels and furniture components.

BACKGROUND OF THE INVENTION

Laminate flooring usually comprise of a core of 6-11 mm fibreboard, a 0.1-0.8 mm thick upper decorative surface layer of laminate and a 0.1-0.6 mm thick lower balancing layer of laminate, plastic, paper or like material. The surface layer provides appearance and durability to the floorboards. The core provides stability, and the balancing layer keeps the board plane after pressing and when the relative humidity (RH) varies during the year. The floorboards are laid floating, i.e. without gluing, on an existing subfloor. Traditional hard floorboards of this type were usually joined by means of glued tongue-and-groove joints. However the majority of all laminate floorboards are presently joined mechanically by means of so-called mechanical locking systems. These systems comprise locking means, which lock the boards horizontally and vertically. The mechanical locking systems are usually formed by machining of the core. Alternatively, parts of the locking system may be formed of separate materials, for example aluminium or plastic, which are factory integrated with the floorboard.

The main advantages of floating floors with mechanical locking systems are that they can easily and quickly be laid by various combinations of angling and snapping. They may also easily be taken up again and used once more at a different location.

The most common core material is a fibreboard with high density and good stability usually called HDF—High Density Fibreboard. Sometimes also MDF—Medium Density Fibreboard—is used as core.

A laminate board which comprises a surface of melamine impregnated decorative paper, plastic, wood, veneer, cork and the like are made by the surface layer and preferably a balancing layer being applied to a core material that in addition to HDF may be made of plywood, chipboard, plastic, and various composite materials. Recently a new board has been developed where a powder, comprising fibres, binders, wear resistant particles and colour pigment, is scattered on a core material and cured by heat and pressure to a solid paper free surface.

As a rule, the above methods result in a laminate board, which is divided by sawing into several panels, which are then machined to provide them with a mechanical locking system at the edges. A laminate board of the size of a panel, which is not necessary to divide, may be produced by the above method. Manufacture of individual floor panels usually takes place when the panels have a surface layer of wood or veneer.

Floorboard with mechanical locking systems may also be produced from solid materials such as solid wood.

In all cases, the above-mentioned floor panels are individually machined along their edges to floorboards. The machining of the edges is carried out in advanced milling machines where the floor panel is exactly positioned between one or more chains and belts, so that the floor panel may be moved at high speed and with great accuracy past a number of milling motors, which are provided with rotating diamond cutting tools or metal cutting tools and which machine the edge of the floor panel. By using several milling motors operating at different angles, advanced joint geometries may be formed at speeds exceeding 200 m/min and with an accuracy of about ±0.05 mm. The accuracy in the vertical direction is generally better than in the horizontal direction since it is difficult to avoid so called swimming which occurs when panels move horizontally in relation to the chain/belt during milling.

Definition of Some Terms

In the following text, the visible surface of the installed panel, such as a floorboard, is called “front side”, while the opposite side of the floorboard, facing the subfloor, is called “rear side”.

By "horizontal plane" is meant a plane, which extends parallel to the front side. Immediately juxtaposed upper parts of two neighboring joint edges of two joined panels together define a "vertical plane" perpendicular to the horizontal plane.

The outer parts of the floorboard at the edge of the floorboard between the front side and the rear side are called "joint edge". As a rule, the joint edge has several "joint surfaces" which may be vertical, horizontal, angled, rounded, beveled, etc.

By "locking system" are meant coacting connecting means, which connect the panels vertically and/or horizontally. By "mechanical locking system" is meant that joining may take place without glue.

By "angling" is meant a connection that occurs by a turning motion, during which an angular change occurs between two parts that are being connected, or disconnected. When angling relates to connection of two floorboards, the angular motion generally takes place with the upper parts of the joint edges at least partly being in contact with each other, during at least part of the motion.

By "up or upward" means toward the front side and by "down or downward" means toward the rear side. By "inwardly" is meant towards the centre of the panel and by "outwardly" means in the opposite direction.

By "carving" is meant a method to form a groove or a protrusion on an edge of a panel by carving a part of the edge to its final shape by one or several carving tool configurations comprising several non-rotating and fixed chip-removing surfaces located along the feeding direction.

Known Technique and Problems Thereof

With a view to facilitating the understanding of embodiments of the present invention, known mechanical locking system will now be described with reference to FIGS. 1*a*-1*e*. In applicable parts, the subsequent description of known technique also applies to the embodiments of the present invention described below.

As shown in FIG. 1*a* the floorboards have a tongue 10 and a groove 9 that locks the edges in a vertical direction. A strip 6, which extends along a first edge 1, protrudes from the edge and has a locking element 8 that cooperates with a locking groove 14 in the adjacent second edge 1' and locks the edges horizontally.

It is evident from this figure and FIG. 1*b*, that since the mechanical locking systems have parts, such as the tongue 10 and the strip 6, that project beyond the upper joint edges, expensive waste W is created when the large board 1*b* is cut by a sawblade 20 into several floor panels and when the locking system is formed.

Even when individual floor panels are produced, for example floors of solid wood, as shown in FIG. 1*c*, considerable waste (W) is caused by forming the strip 6 and the tongue 10.

These systems and the manufacturing methods suffer from a number of drawbacks, which are above all related to cost and function.

The waste is mainly related to the long edge locking system, which generally is installed by angling. The total waste may be about 10 mm or more or about 5% in floorboards that have a width of about 200 mm. The waste in narrow floorboards with a width of for example 100 mm may be about 10%.

To counteract these problems, different methods are used. The most important method is to limit the extent of the projecting parts. This usually results in lower locking strength and difficulties in laying or detaching the floorboards.

Another method is to use separate materials, for example aluminium or plastic, to form the strip or the tongue. Such materials are generally not cost efficient in low cost floors with a surface layer and a core made of very cost efficient materials such as impregnated paper and HDF respectively.

It is known that a locking system may be formed with overlapping edges A, B and a lower tongue C as shown in FIG. 1*d* (WO 2005/068747 Välinge Innovation AB). Such locking system will not reduce the waste. The overlapping edge or small tongue A is mainly used to facilitate horizontal displacement between the edges. FIG. 1*e* shows a known locking system (WO 2006/043893 Välinge Innovation AB) that has a separate flexible tongue 10 attached above the strip 6 and that is mainly intended to lock the short edges with vertical folding or vertical snapping.

Brief Description of Embodiments of the Invention and Objects Thereof

An object of embodiments of the present invention is to provide a locking system that is made in one piece with the core, that guides the adjacent edges automatically into a correct position during angling, that has a high locking strength and that is possible to produce with minimum material waste in connection with cutting of the large board and the final forming of the edges and the mechanical locking system.

A further object of embodiments of the invention is to provide a rational and cost-efficient manufacturing method to divide a board into floorboards which are in a second production step machined to provide them with a mechanical locking system.

The above objects may be achieved wholly or partly by locking systems, floor panels and production methods according to embodiments of the invention.

A first aspect of embodiments of the invention is a method for dividing a board into a first panel and a second panel, wherein the method comprises the step of displacing the board and dividing the board by a fixed tool, such as scraping or carving tool.

The method preferably comprises the step of forming a first vertically open groove, through a rear side of the board and an offset second vertically open groove, through a front side of the board.

A fixed tool or a saw blade may form the first vertically open groove.

The second vertically open groove may be formed by a fixed tool or a saw blade. The second vertically open groove is preferably made by sawing in order to obtain a smooth edge with less chipping at an edge of the front side, since the edge may be visible when the panel is installed.

The method may comprise the step of forming, by a fixed tool, a first horizontally extending groove that extends horizontally under the front side and/or rear side of the board.

The first horizontally extending groove may extend from the second groove towards the first groove.

The first horizontally extending groove may extend from the first groove towards the second groove.

The first horizontally extending groove may connect the first vertically open groove and the second vertically open groove.

The method may comprise the step of forming, by a fixed tool, a second horizontally extending groove that extends horizontally under the front side and/or rear side of the board, wherein the second horizontally extending groove extends from the second vertically open groove towards the first vertically open groove and the first horizontally extending groove extends from the first vertically open groove towards the second vertically open groove.

The first horizontally extending grooves may be connected with the second horizontally extending grooves.

The forming of the second vertically open groove may be made by sawing by a rotating saw blade.

The forming of the first groove is preferably made before the cutting of the second groove and wherein the first groove is made by a fixed tool. The step of displacing the board past the fixed tool, is preferably made before the sawing step, since that makes it easier to absorb the forces created by the fixed tool when forming the groove.

The method may comprise the step of method arranging the board on a carrier, such as a conveyor belt/chain, preferably provided with a pushing device, such as a cam or ridge. The pushing device, such as a cam or ridge, increases the force the building element may be pushed towards the fixed tool.

The front side of the board may be arranged against the carrier and facing downwards. The front side is preferably arranged facing downward and supported by a carrier, such as a conveyor belt/chain. If the steps above forms a part of a locking system that increase the production tolerances and critical locking surfaces may be produced with high tolerances.

The fixed tool may comprise several carving teeth, arranged for forming at different vertical and/or horizontal positions.

The method may comprise the step of removing the chips created by the fixed tool by compressed air, preferably by a compressed air nozzle, and preferably collected by a suction device.

The board may be a wood based board, a laminated board, such as a floor element comprising a core of HDF or MDF, a decorative layer and a balancing layer, a plywood board, or a board comprising a plastic core and preferably a decorative layer.

The laminated board may comprise a core provided with a decorative surface layer and a balancing layer.

The method may comprise the step of removing the chips created by the forming, preferably by several compressed air nozzles, and preferably sorting and disposing into separate containers the chips from the core and the balancing layer and/or the decorative layer.

A second aspect of embodiments of the invention is method of forming a mechanical locking system for locking of a first and a second panel, wherein the method comprises the steps:

- dividing a board into a first and a second panel according to the methods described herein and thereby forming a lower protruding part at a first edge of the first panel and a lower groove at a second edge of the second panel;
- forming a locking element at the lower protruding part; and forming a locking groove at the lower groove.

A third aspect of embodiments of the invention are building panels, each comprising an upper surface and a core, provided with a locking system for vertical and horizontal locking of a first edge of a first building panel to an adjacent second edge of a second building panel. The upper parts of the first and the second edge together define in a locked position a vertical plane, which perpendicular to a horizontal plane, which is parallel to the upper surface of the first and the second building panel. The locking system is configured to enable assembling of the first and the second edge by angling the first and the second building panel relative each other. The locking system comprises a tongue, made in one piece with said core, and a tongue groove configured to cooperate for vertical locking, and a strip at the first edge, made in one piece with the core, which is provided with a locking element, and configured to cooperate for horizontal locking with a downwardly open locking groove formed in the second edge. The first and the second building panel (may obtain a relative position with a distance between the first and the second edge, in said position the upper surface of the first and the second building panel (1, 1') are in the same horizontal plane and an edge part of the second edge is located vertically above the upper part of the locking element and that there is a vertically extending space S of at least about 0.5 mm between the locking element and all parts of the second edge which is located above the locking element.

The edge part may be located at the vertical plane.

The locking element may comprises a locking surface that cooperates with a locking surface at the locking groove for horizontal locking and wherein the edge part is located vertically above the locking surface of the locking element.

The space may be larger than 0.6 mm.

The space may be equal or larger above the outer part of the locking element than above the upper part of the locking element.

The edge portion may comprise a lower part that is inclined downwards and inwardly.

The edge part may comprise a lower part of the tongue.

The building panel may be a floorboard.

A fourth aspect of embodiments of the invention is a method to divide a board, comprising a core and a surface, wherein the method comprises the step of:

- forming in the core a first and a second essentially vertical grooves, which are horizontally offset, wherein the first groove comprises an opening towards the front side and the second groove comprises an opening towards the rear side of the board;
- dividing the board into a first floor panel with a first edge and a second floor panel with a second edge, wherein the first edge is adjacent the second edge; and
- forming a locking system on the first and second edge comprising a strip, a locking element and a locking groove for horizontal locking and a tongue and a tongue groove for vertical locking.

The second groove may be formed by a carving tool.

The board may be divided by a carving tool.

The board may be divided by carving tools that are inserted into the first and the second grooves.

The carving tool that divides the panels may cut an essentially horizontally extending groove that comprises an angle of less than 45 degrees against the horizontal plane HP.

The first or the second groove may be formed by a carving tool with carving teeth that are displaced horizontally with a distance of at least about 0.2 mm.

A fifth aspect of embodiments of the invention is building panels comprising a surface and a core, provided with a locking system for vertical and horizontal locking of a first edge of a first building panel to an adjacent second edge of a second building panel. The upper parts of the first and the second edge, in a locked position, together define a vertical plane perpendicular to a horizontal plane, which is parallel to the surface. The locking system is configured to enable assembling of the first and the second edge by angling the first and the second building panel relative each other. The locking system comprises a tongue, made in one piece with said core, and a tongue groove configured to cooperate for vertical locking. The first edge comprises a strip, made in one piece with the core, which is provided with a locking element, which is configured to cooperate for horizontal locking with a downwardly open locking groove formed in the second edge. The tongue, which is provided on the first edge, cooperates with a lower lip of the tongue groove, which is provided at the second edge and comprises lower vertically locking surfaces. The locking element and the locking groove cooperate at horizontally locking surfaces. The tongue protrudes outwardly beyond the vertical plane and the tongue groove comprises an upper lip. The horizontal extension of the lower lip, in relation to the upper lip, is smaller than the horizontal extension of the tongue.

The building panels may comprise cooperating horizontally locking surfaces that lock the edges both horizontally and vertically with horizontal and vertical pre tension.

The building panels may comprise a tongue that cooperates with the upper lip at upper vertically locking surfaces.

The tongue and the tongue groove may comprise upper and lower vertically locking surfaces that are essentially parallel with the horizontal plane and offset horizontally such that a part of the upper vertically locking surfaces are horizontally closer to the locking element than the lower vertically locking surfaces.

The lower lip may protrude beyond the upper lip and the vertical plane.

The horizontal extension of the tongue may be at least about twice as large as the horizontal extension of the lower lip.

The tongue and the tongue groove may comprise guiding surfaces that are configured to be in contact with each other, during the assembling by angling, when an edge part of the second edge is in contact with the strip and/or the locking element.

The guiding surfaces may be inclined relative the vertical plane and located on the upper and/or lower parts of the tongue and the tongue groove.

The horizontal locking surfaces may be located below a horizontal strip plane that intersects an upper part of the strip, which is located essentially vertically under the outer part of the tongue.

The horizontally locking surfaces may be located both below and above the horizontal strip plane.

The horizontal locking surfaces may be located above the horizontal strip plane.

The locking system may comprise a space between the upper part of the strip and an edge portion of the second panel located essentially under the tongue.

The upper vertically locking surfaces may be offset horizontally in relation to the horizontally locking surfaces.

The vertically and horizontally locking surfaces may be offset horizontally with a horizontal distance that is larger than the horizontal extension of the tongue.

The core may comprise HDF, particleboard plastic or plywood.

The horizontally locking surfaces may have a locking angle of about 40-60 degrees against the horizontal plane.

A sixth aspect of embodiments of the invention is a method to divide a board, comprising a core and a surface, wherein the method comprises the step of:

- forming in the core a first and a second essentially vertical groove, which are horizontally offset, wherein the first groove comprises an opening towards the front side and the second groove comprises an opening towards the rear side of the board;
- dividing the board into a first floor panel with a first edge and a second floor panel with a second edge, wherein the first edge is adjacent the second edge; and
- forming a locking strip and a tongue for vertically and horizontally locking of the first and the second floor panel, wherein the locking strip and the tongue protrude horizontally beyond an upper part of the first edge of the first panel.

The board may be divided by knives.

The board may be divided by scraping of the core.

The board may comprise a plywood core, which is divided at least partly along one of the veneers.

The board may comprise a plywood core, which is divided essentially along one of the veneers, which comprises a fibre orientation essentially oriented from one groove towards the other groove.

The first or the second groove may be formed by a rotating tool and the other groove by carving or scraping.

The second groove may be formed by carving or scraping.

The first and the second grooves may be formed by carving or scraping.

A seventh aspect of embodiments of the invention is a building panel, such as a floor panel, according to the third or fifth aspect and produced according to the first, the second, the fourth or the sixth aspect.

A locking system that comprises a tongue on the same edges as the protruding strip and that allows a separation of board by two offset cutting grooves provides a considerable material saving. The joint geometry as describes above provides precise guiding of the edges during locking and a strong lock when the edges are angled into a locked position.

BRIEF DESCRIPTION OF THE DRAWINGS

The present invention will by way of example be described in more detail with reference to the appended schematic drawings, which shows embodiments of the present invention.

DESCRIPTION OF EMBODIMENTS OF THE INVENTION

A first embodiment of floorboards 1, 1' provided with a mechanical locking system according to the invention is shown in FIGS. 2*a*-2*d*.

Figure 1A:
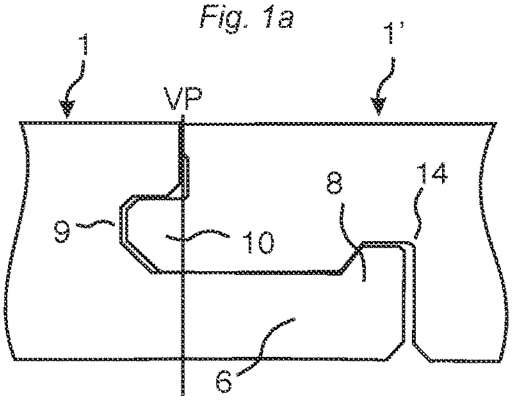
FIGS. 1*a-e* illustrate known technology.
Figure 1B:
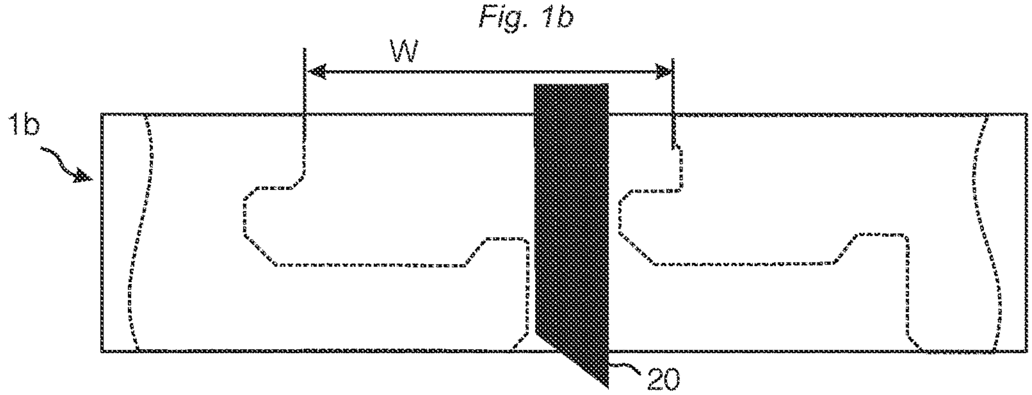
Figure 1C:
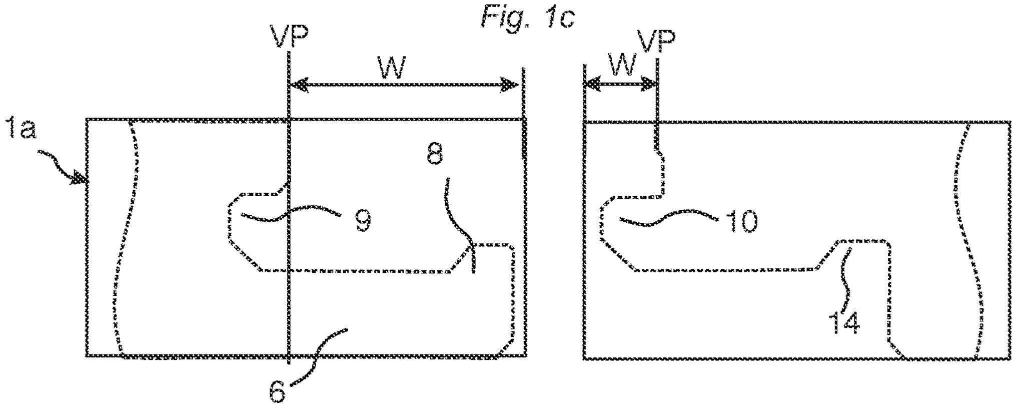
Figure 1D:
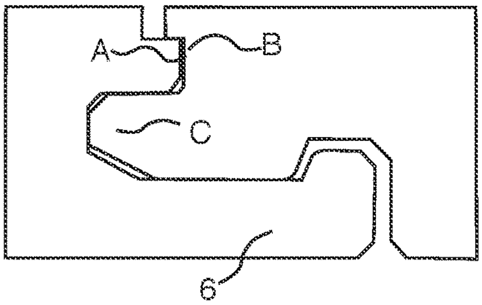
Figure 1E:
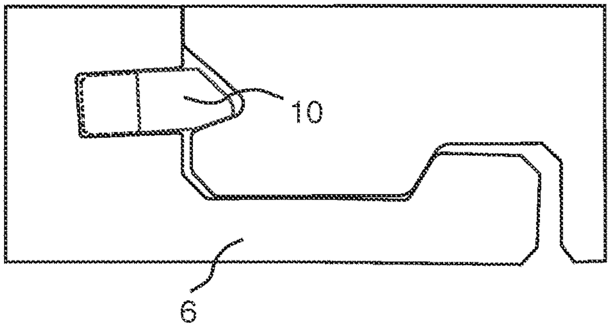
Figure 2A:
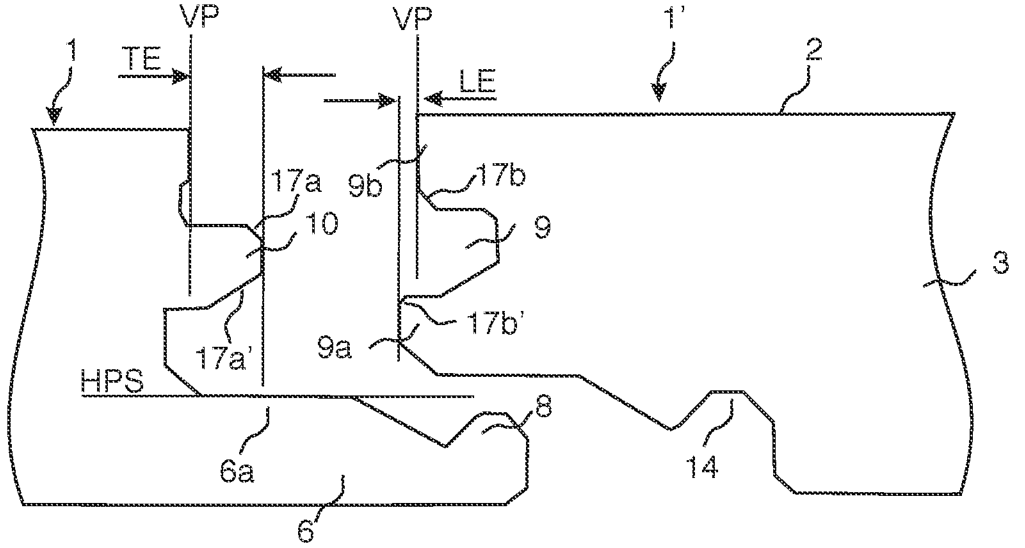
FIGS. 2*a-d* illustrate a locking system according to an embodiment of the invention.
Figure 2B:
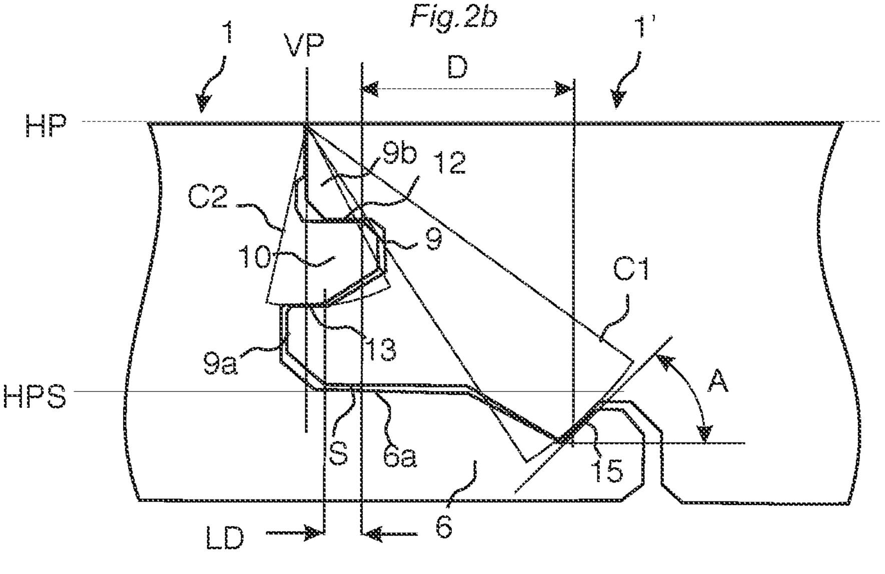

A building panel is shown that in this embodiment is a floorboard comprising a surface 2 attached to, or of, a core 3. The floorboard is provided with a locking system for vertical and horizontal locking of a first 1 and a second edge 1' of adjacent panel edges. The upper parts of two edges 1,1' of two joined floorboards together define a vertical plane VP. The vertical plane is perpendicular to a horizontal plane HP that is parallel to the panel surface. The locking system is configured to lock the edges 1, 1' by angling two adjacent edges relative each other. The locking system comprises a tongue 10 made in one piece with said core 3 that cooperates with tongue groove 9 in the adjacent edge 1' for vertical locking. The tongue groove 9 comprises a lower lip 9*a* and an upper lip 9*b* above the lower lip. The first edge 1 comprises a strip 6 made in one piece with the core 3 and provided with a locking element 8 which cooperates for horizontal locking with a downwardly open locking groove 14 formed in the second adjacent edge 1'. The tongue 10 is located on the first edge 1 above the strip 6 and protrudes outwardly beyond the vertical plane VP. FIG. 2*b* shows that the tongue 10 and the tongue groove 9 comprise upper 12 and lower 13 cooperating vertically locking surfaces. The locking element 8 and the locking groove 14 comprises cooperating horizontally locking surfaces 15 that lock horizontally and prevents a horizontal separation of the adjacent edges 1, 1'.

The geometry of an angling locking system is limited in many respects by the rotating movement that is needed to accomplish a locking. The locking surfaces are, during the final stage of the angling motion, rotated along circles C1, C2, which have a centre point at the vertical plane in the upper part of the joint edges. A tangent line defines the "free angle" A that is the angle when the edges may be locked and separated without any locking surfaces that overlap each other and prevents such locking or disconnection. The free angle A increases when the locking element 8 is closer to the surface and/or more distant horizontally to the vertical plane VP. This means that a low locking angle makes it possible to design compact and cost efficient locking system. However this has a negative effect on the locking strength and the final guiding into a locked position. Over angling with locking angles LA higher than the free angle may be used if the locking surfaces are small and the material is partly compressible. Generally the horizontally locking surfaces 15 should comprise a locking angle of more than about 30 degrees in order to provide sufficient strength and guiding. Higher locking angles are even more preferable and a high quality locking system requires generally a locking angle of 45-60 degrees. Locking systems with higher locking angles that may be up to 90 degrees provides very strong locking. All such locking angles may be obtained with a locking system according to certain embodiments of the described invention.

The tongue 10 and the tongue groove 9 should also be formed and adapted to the rotation during the final locking step. Rounded locking surfaces are optimal for a locking with angling but are in practice not suitable to use due to production tolerance. The ideal geometry is therefor essentially plane locking surfaces parallel with the surface that allow that the rotating tools may be displaced horizontally without any effect on the vertical position of the upper edges. The locking system has therefore in this embodiment preferably a lower lip 9*a* located under the tongue 10 that extends beyond the upper lip 9*b* and that allows forming of plane vertically locking surfaces 12, 13 that are essentially parallel with the horizontal plane HP. The tongue 10 and the tongue groove 9 comprises preferably upper 12 and lower 13 vertically locking surfaces that are essentially parallel with the horizontal plane HP and offset horizontally such that a part of the upper vertically locking surfaces 12 are closer to the locking element 8 than the lower vertically locking surfaces 13.

The horizontal extension TE of the tongue 10 is larger than the horizontal extension LE of the lower lip 9*a* extending beyond the upper lip 9*b*. The locking system may also be formed with a lower lip 9*b* that is not extending beyond the upper lip 9*b* or even with an upper lip 9*b* that protrudes horizontally beyond the lower lip 9*a*. Having the eventual extension LE of the lower lip 9*b* as small as possible may limit the material waste. It is preferred that the extension of the lower lip 9*a* does not exceed more than about 0.5 times the extension TE of the tongue 10. A small extending lower lip 9*b* will not create additional waste since the saw blade must generally cut at a small distance from the edge in order to allow a final machining of the edges that removes chipping caused by the saw. This cutting distance to the final edge is also used to machine and form "banana shaped" edges into a straight edge. A small extension LE of about 1 mm will therefore not increase the material waste but may be used to form locking surfaces and/or guiding surfaces in the lower lip 9*a*. A strong vertical locking force may be obtained in a wood or HDF core with vertically locking surfaces 12, 13 that comprises a horizontal extension of about 1 mm and even less for example 0.5 mm may be sufficient in some applications.

The locking system comprises preferably a space S between the upper part of the strip 6 and the second edge 1'. This may be used to eliminate the need for a precise positioning of the machining tools. The space S is preferably located vertically under the tongue 10.

The locking system should be able to guide the edges into a correct position during installation. The floorboards are often somewhat curved or bended and the locking system should be able to straighten such bending and to guide the edges into a correct position.

Figure 2C:
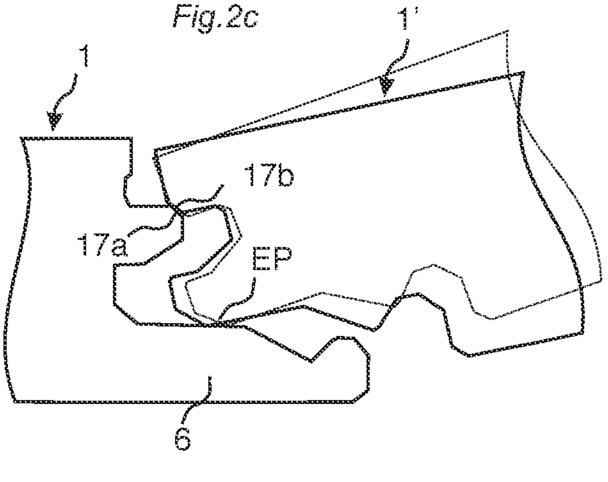
Figure 2D:
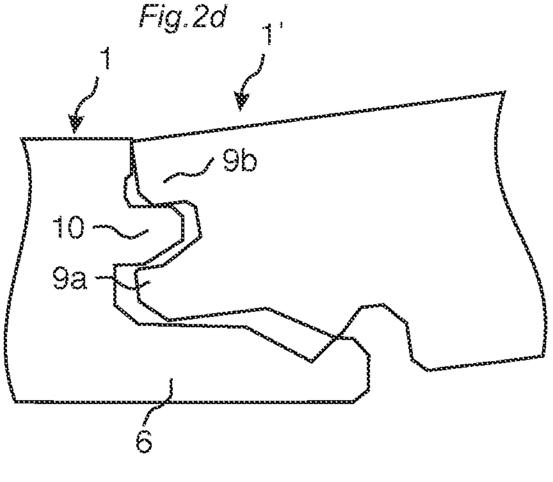

The tongue 10 and the groove 9 comprises preferably guiding surfaces 17*a*, 17*b* that are in contact with each other during angling when an edge portion EP of the second edge 1' is in contact with the strip 6 and/or the locking element 8 as shown in FIG. 2*c*

The guiding surfaces 17*a*, 17*a'*, 17*b*, 17*b'* are preferably inclined relative the vertical plane VP and may be located on the upper and/or lower parts of the tongue 10 and the tongue groove 9. The guiding surfaces may also be rounded. At least two cooperating guiding surfaces 17*a*, 17*b* should preferably be in contact with each other when the second edge 1' is position in an angle of about 10-20 degrees against the horizontal plane and with an edge portion EP in contact with the strip and/or the locking element as shown in FIG. 2*c*.

The upper vertically locking surfaces 12 are preferably offset horizontally in relation to the lower horizontally locking surfaces 13 with a distance LD. It is preferred that this distance LD is larger than zero. LD is preferably larger than 20% of the horizontal extension TE of the tongue 10.

The upper vertically locking surfaces 12 are preferably offset horizontally in relation to the lower horizontally locking surfaces 15 with a distance D. It is preferred that this distance D is larger than the horizontal extension TE of the tongue.

In this preferred embodiment the horizontally locking surfaces 15 are located below a horizontal strip plane HPS that intersects an upper part 6*a* of the strip 6. This upper part is preferably located essentially vertically under the outer part of the tongue 10. Such geometry simplifies the forming of the edges since for example only vertically and horizontally rotating tools may be used. It allows maximum materials savings as described further below.

FIGS. 3*a*-3*f* show that the locking system may more compact if the locking element 8 is moved towards the upper part of the floorboard.

Figure 3A:
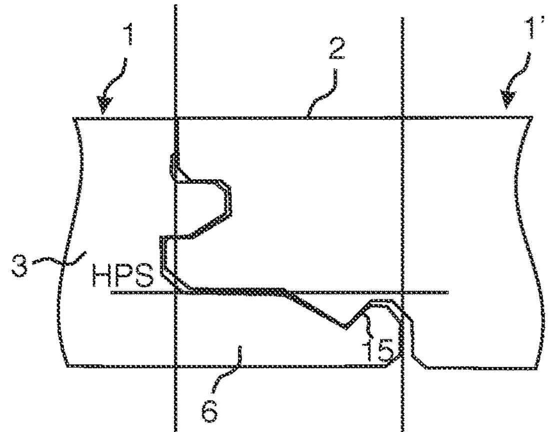
FIGS. 3*a-f* show alternative embodiments of the invention.
Figure 3B:
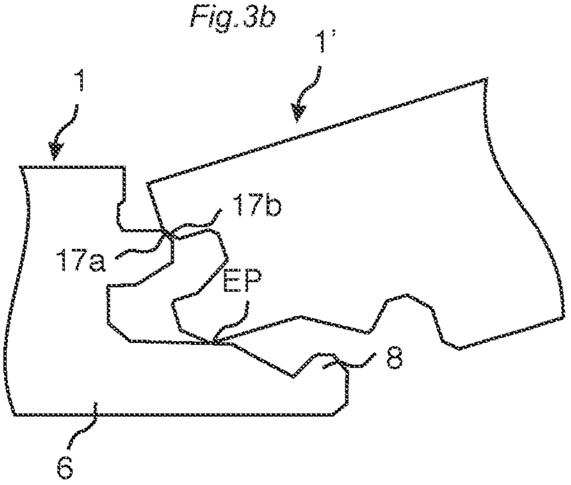
Figure 3C:
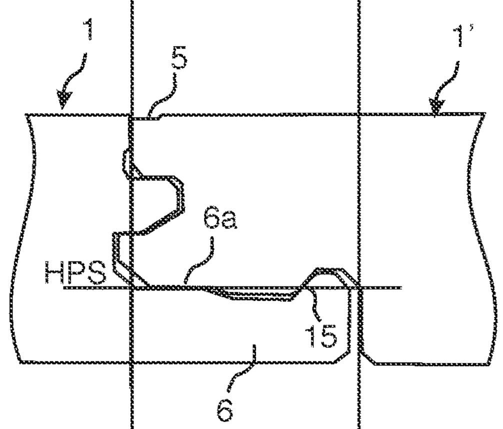
Figure 3D:
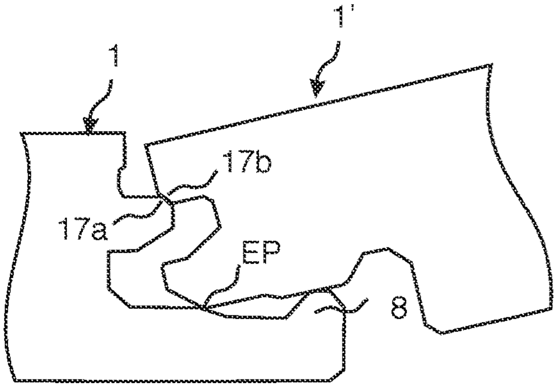

FIG. 3*c* shows that the horizontally locking surfaces 15 may be located both below and above the horizontal strip plane HPS.

Figure 3E:
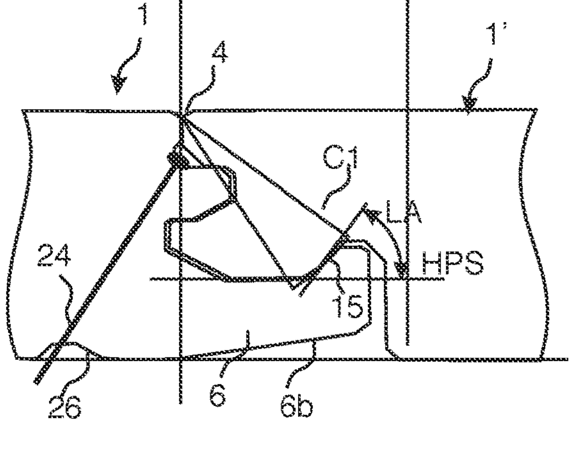
Figure 3F:
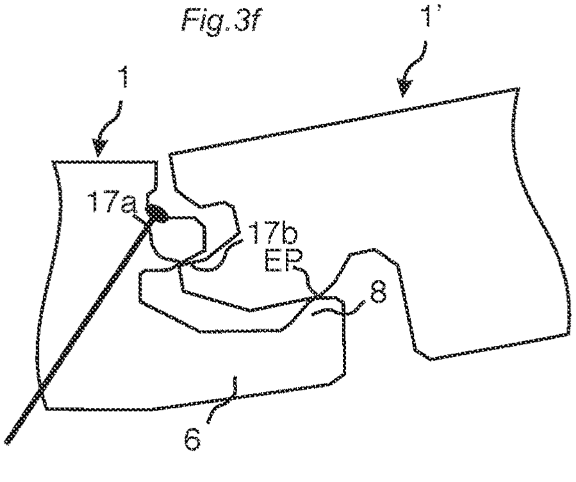

FIG. 3*e* shows that the horizontally locking surfaces 15 may also be located above the horizontal strip plane HPS. The locking angle LA is in this embodiment about 60 degrees. The free angle is about 50 degrees which means that this locking system comprises an over angling of about 10 degrees. The strip 6 comprises a rear side 6*b*, which is somewhat angled upwards and where the balancing layer and/or the core has been removed. This increases the flexibility of the strip and allows a small bending during locking and unlocking. It may also be used to create a pre-determined flexibility of the strip that may be used to create a pre tension inwardly and upwardly. This may be used to increase the angle of the horizontally locking surfaces and to eliminate some production tolerances. The floorboards may also be connected to the sub floor by nailing down and the tongue 10 provides a strong base for a nail 24. A nailing groove 26 may be formed on the rear side in order to prevent splitting of the rear side.

The floorboards may have bevels 4 or a decorative groove 5 at the upper edges. It is preferred that the decorative groove 5 is formed on the second edge 1' where chipping from the saw blade is most critical.

Figure 4A:
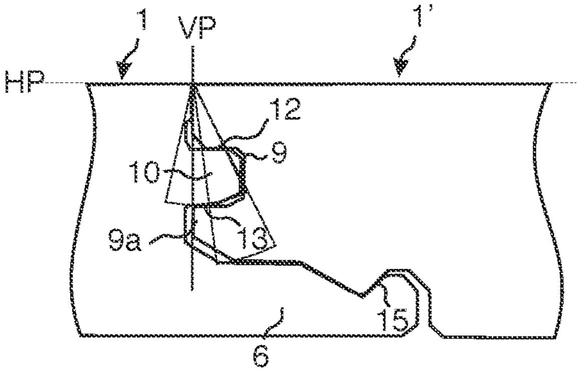
FIGS. 4*a-f* show alternative embodiments of the invention.
Figure 4B:
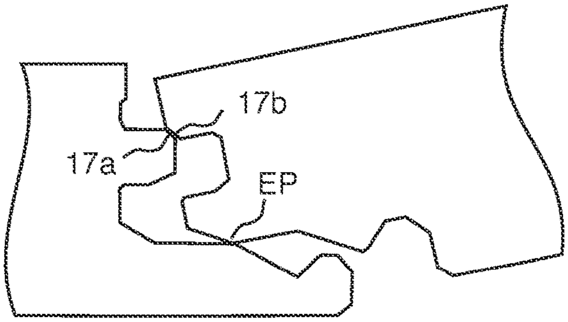
Figure 4C:
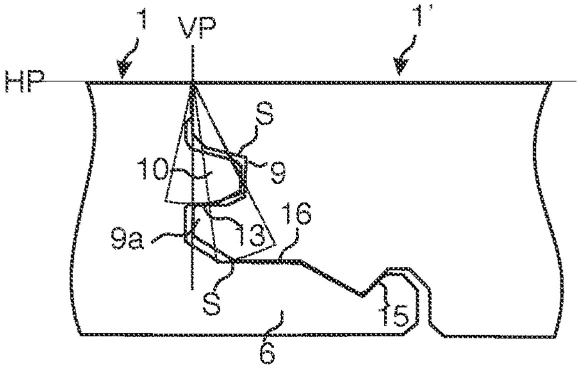
Figure 4D:
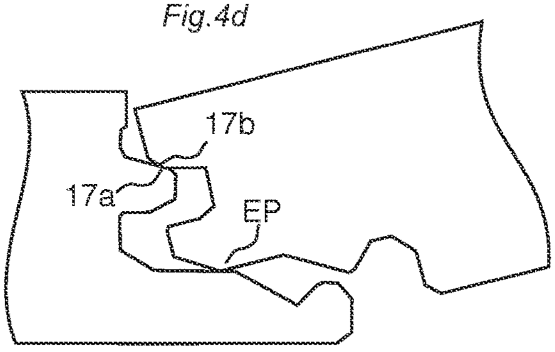
Figure 4E:
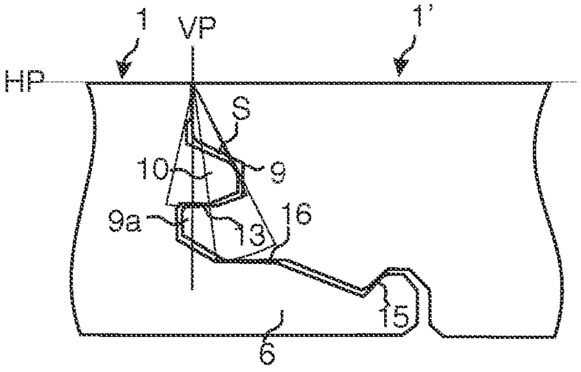
Figure 4F:
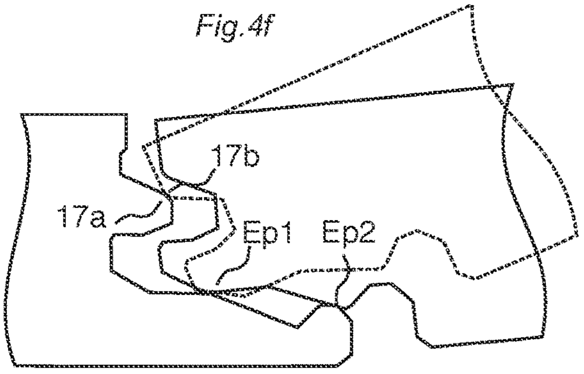

FIGS. 4*a*-4*f* describe embodiments of the invention. FIG. 4*a* shows that the locking system may be formed without a protruding lower lip and without a space between the strip 6 and the lower part of the adjacent edge. FIG. 4*c* shows that vertical locking may be obtained with lower vertically locking surfaces 13 located on the lower part of the tongue 10 and on the upper part 16 of the strip 6 and the lower part of the second edge 1'.

Figure 5A:
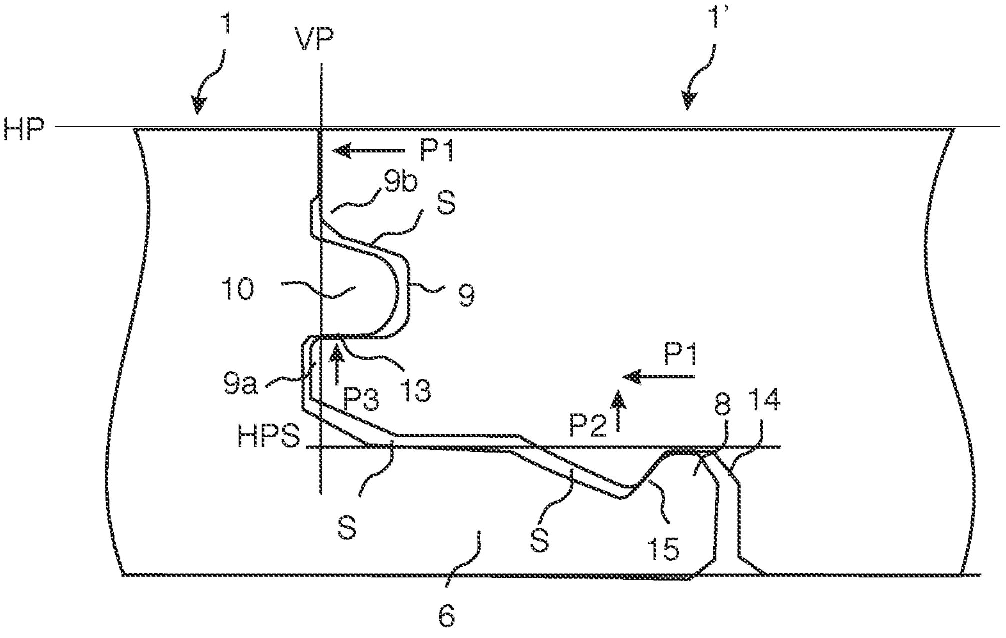
FIGS. 5*a-b* show a preferred embodiment of the locking system.
Figure 5B:
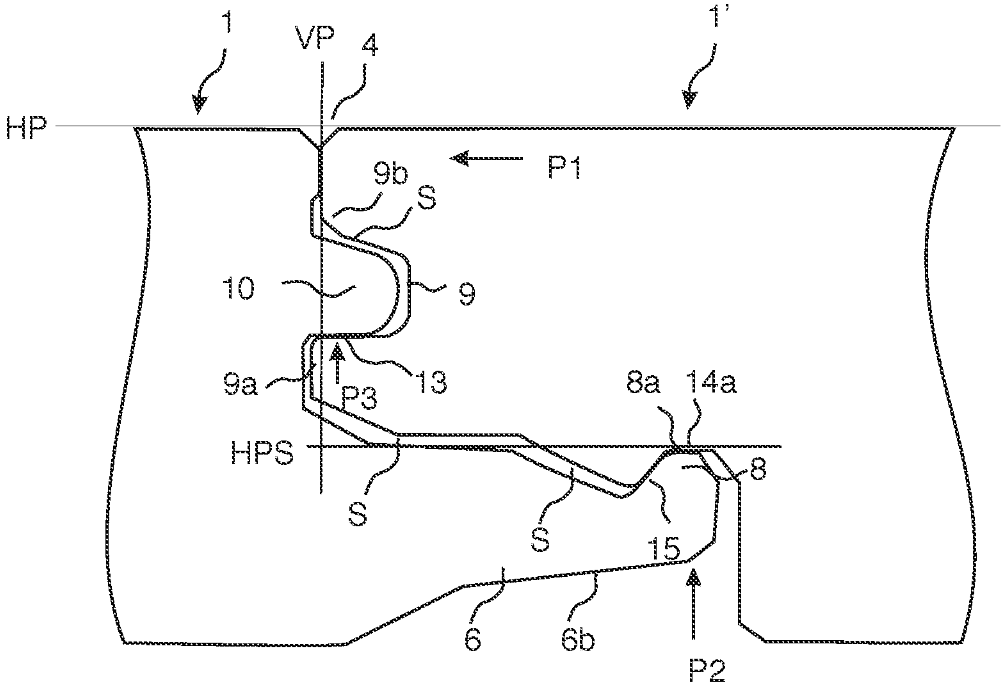

FIGS. 5*a*-*b* show that it is also possible to use only the lower vertically locking surfaces 13 and the horizontally locking surfaces 15 for the vertical locking. There may be a space S over the tongue 10 and between the upper part of the strip 6 and the lower part of the second edge 1'. The strip may be used to create a pre tension P inwardly P1 and upwardly P2 with the inclined locking surfaces 15 at the locking element 8. This pre tension may create a pressing force P3 that presses the lower locking surface 13 together. The strip is slightly bended downwards in locked position. This makes it possible to eliminate the need for tight production tolerances even further. Only the position of the lower locking surfaces 13 must be accurately controlled in order to produce a floor without so called "over wood" at the upper joint edges.

A locking angle of about 40-60 degrees is preferable to create such horizontal and vertical pre tension. The vertical pre tension may also be created by an upper part of the locking element 8*a* that presses against an inner part of the locking groove 14*a*.

FIG. 5*b* shows that essentially the same joint geometry may be used even if the floor thickness is increased. The lower part of the strip 6*b* may be such that the strip thickness is reduced. Alternatively a horizontal groove may be formed in the strip under the locking element in order to increase the flexibility.

All described embodiments may be partly or completely combined into alternative embodiments. The locking systems may be used to lock long and/or short edges with an angling action. The locking system may also be adapted to be locked with horizontal snapping whereby the strip bends 6 backwards during the snapping action when lower guiding surfaces on the tongue and the lower lip cooperate with each other. This may for example be used to connect a long edge to a short edge or to snap long edges when angling is not possible.

The locking system may also be connected by angling of the first edge 1 whereby the strip 6 is inserted under the lower lip.

FIGS. 6*a*-6*g* show several production methods of dividing a board. The board may be a laminate board comprising a core 3, an upper surface 2, preferably comprising a decorative layer, and a lower surface, preferably comprising a balancing layer, into a first and a second panel, with first and second adjacent edges 1,1'. Two adjacent edges 1,1' are formed comprising a locking system that locks vertically and horizontally. The first and the second panel may be e.g. building panels or floor panels.

The methods may be used to divide the board into a first and a second panel. The first panel comprises a first edge 1 adjacent a second edge 1' of the second panel. The first edge comprises an extension (10,6,8) that protrudes horizontally beyond an upper part of the first edge 1. A first and a second vertically open grooves 19, 18, are formed in the board by for example rotating saw blades 20. The grooves are horizontally offset.

The second vertical open groove 18 comprises an opening towards the front side of the board and the first vertical groove 19 comprises an opening towards the rear side of the board. The board may be divided into several panels in various ways.

Figure 6A:
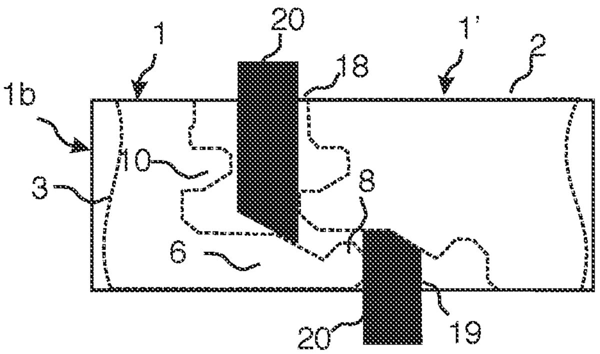
FIGS. 6*a*-6*g* show separation of a board into several floor panels according to an embodiment of the invention.
Figure 6B:
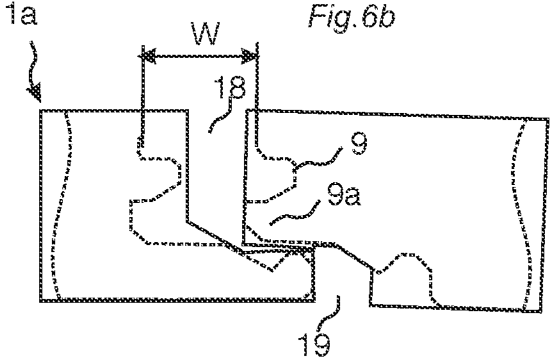

FIG. 6*b* shows breaking or splitting that may be obtained by angling or pressing apart the edges 1, 1'. This method is very suitable when HDF is used as a core since the fibres are oriented horizontally and the crack is essentially horizontal. The same method may be used in a plywood core with different layer that may be design to create a controlled crack along one of the veneers. Preferably the fibre orientation is essentially oriented from one groove towards the other groove.

Figure 6C:
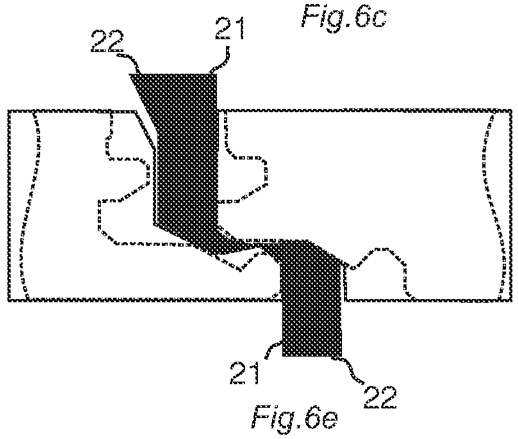

The methods of dividing may also comprise the step of cutting by a fixed tool or fixed tools, such as a knife(s) 21, and/or scraping and/or carving tool(s) 22, as shown in FIG. 6*c*.

A preferred embodiment comprises the step of forming a horizontally extending groove in the first vertical open groove and/or the second groove by the fixed tool (22). The horizontally extending groove extends from one of the first groove or the second vertically open groove toward the other of the first groove or the second vertically open groove. The horizontally extending groove extends under the front side of the board and/or above the rear side of board. FIG. 6*c* shows an embodiment comprising the step of forming a first horizontally extending groove, which extends from the first vertically open groove towards the second vertically open groove, and forming a second horizontally extending groove, which extends from the second vertically open groove towards the first vertically open groove. Embodiments may comprise the step of cutting a part of the first and/or the second vertically open groove by a saw blade before cutting a first and/or a second horizontally extending groove by a fixed tool.

Figure 6D:
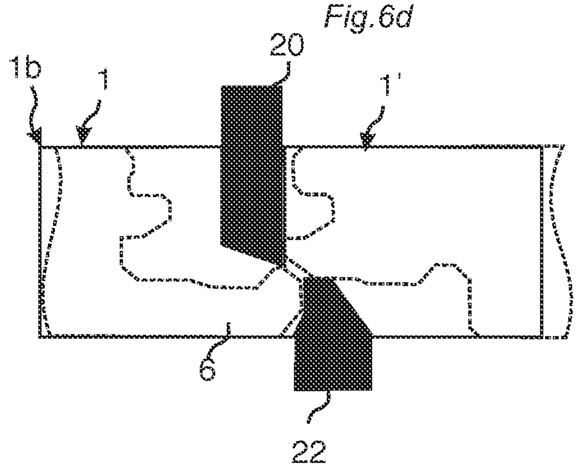
Figure 6E:
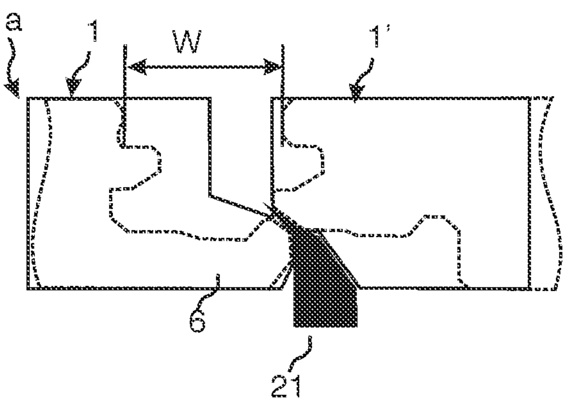

FIG. 6*d* shows that the first vertically open groove may be formed by a rotating saw blade 20 and the second vertically open groove may be formed by a scraping or carving tool 22. FIG. 6*e* shows that a knife 21 may be used to divide the first and second panel.

Figure 6F:
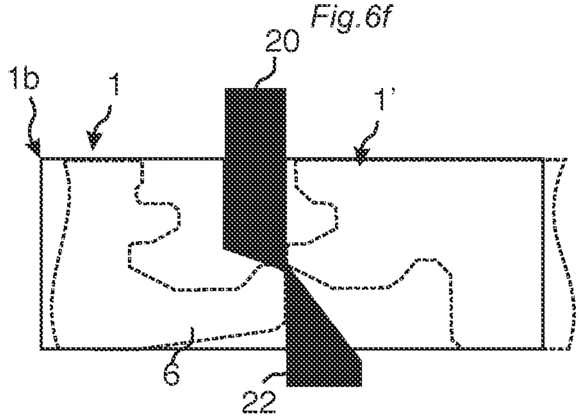
Figure 6G:
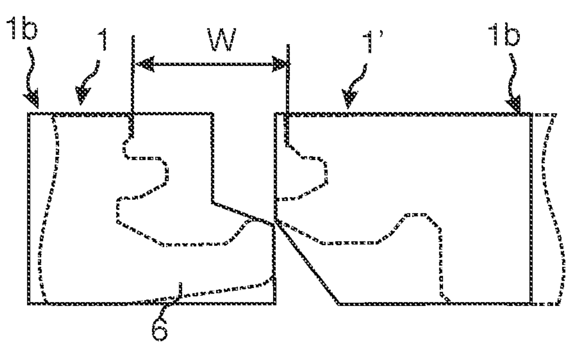
Figure 7A:
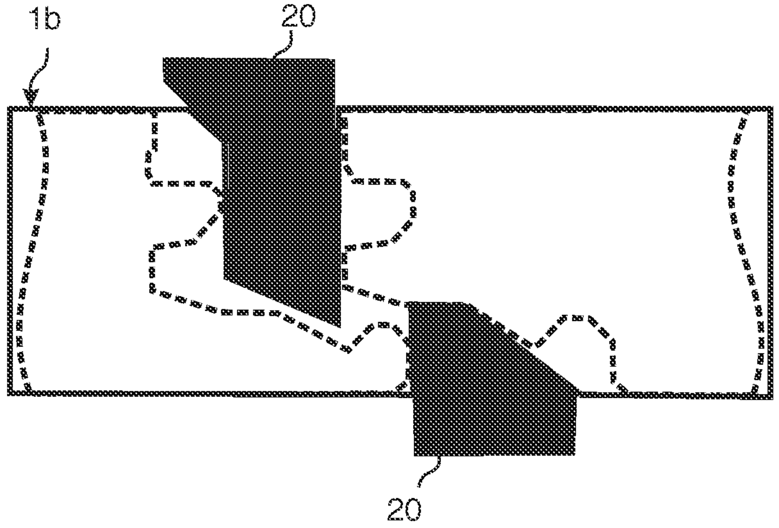
FIGS. 7*a-b* show separation with a band saw according to an embodiment of the invention.
Figure 7B:
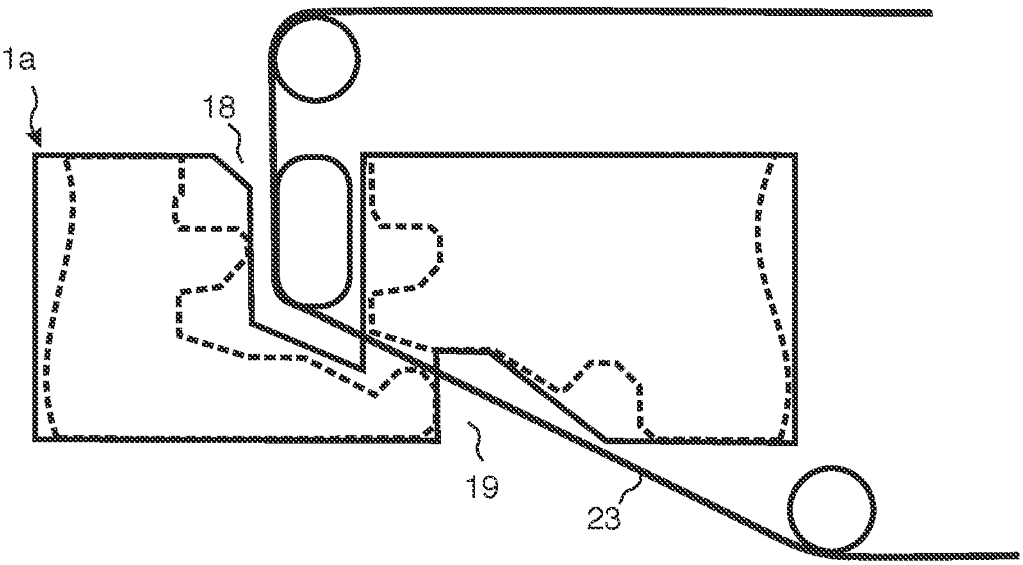

FIGS. 6*f* and 6*g* shows an embodiment including forming of the first vertically open groove and of the second vertically open groove that overlap each other. The second vertically open groove may be formed by a sawblade and the first vertically groove by a scraping or carving tool 22. The step of splitting or forming of the horizontal groove is not required in this embodiment FIGS. 7*a* and 7*b* shows that the final separation may be made with a band saw 23 that cuts the core. Such a separation gives a very controlled cut and may be used in materials that are difficult to split, cut or carve.

Figure 7C:
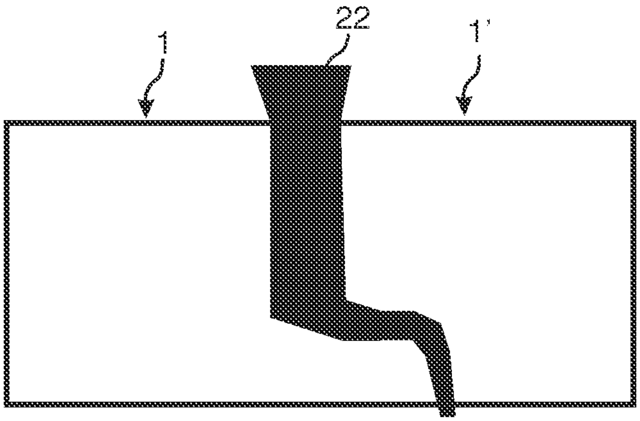
FIG. 7*c* shows a method to divide a board into two panels by a fixed tool(s), such as a carving or scraping tool, according to an embodiment of the invention.

FIG. 7*c* shows an embodiment for dividing a board to a first panel (1) and a second panel 1' by a by displacing the board past a fixed tool 22, such as a carving or scraping tool. The board may be provided with a balancing layer and/or a decorative layer and a fixed tool makes it possible to sort and dispose into separate containers chips from the core and the balancing layer and/or the decorative layer. The chips are preferably removed by several compressed air nozzles. Adjacent edges of the first and the second panel are preferably vertically overlapping and comprise a lower protruding part at a first edge of the first panel and a lower groove at a second edge of the second pane. A mechanical locking system, e.g. as described herein, may be formed at the adjacent edges by e.g. milling, carving or scraping. A locking element may be formed at the lower protruding part that is configured to cooperate with a locking groove, which may be formed at the lower groove. The vertically overlapping edges may reduce the waste of the board material relating to the dividing of the board and the forming the mechanical locking system. The method illustrated in FIG. 7*c* is preferably used for dividing MDF or HDF boards or boards comprising plastic, such as PVC.

Figure 8A:
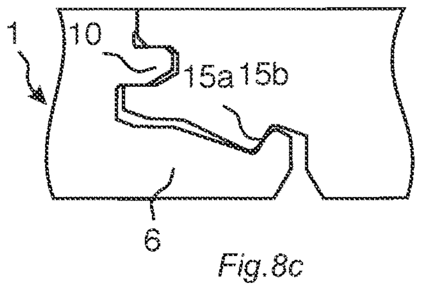
FIGS. 8*a-e* show a locking system and a method to divide the panels with carving tools according to embodiments of the invention.
Figure 8B:
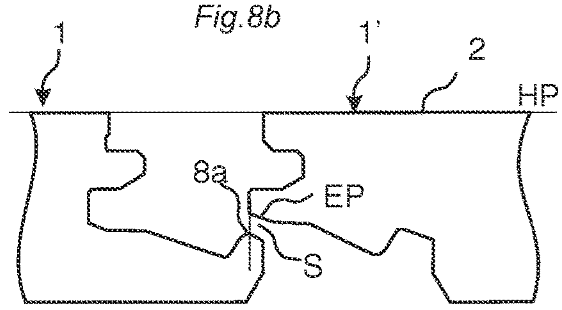

FIG. 8*a* show a preferred locking system with a tongue 10 on the strip side 1. FIG. 8*b* show that the edges 1, 1' can obtain a relative position such that the upper surfaces 2 are positioned along the same horizontal plane HP and such that an edge part EP of one of the adjacent edges is located vertically above the upper part 8*a* of the locking element 8 and that there is a vertically extending space S of at least about 0.5 mm between the locking element 8 and the whole adjacent edge which is located above the locking element 8. The space S may be smaller but this makes the final separation much more costly and complicated.

Figure 8C:
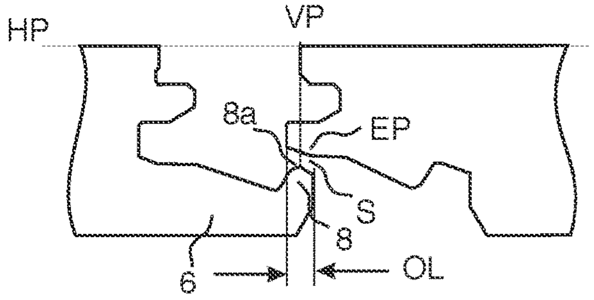
Figure 8D:
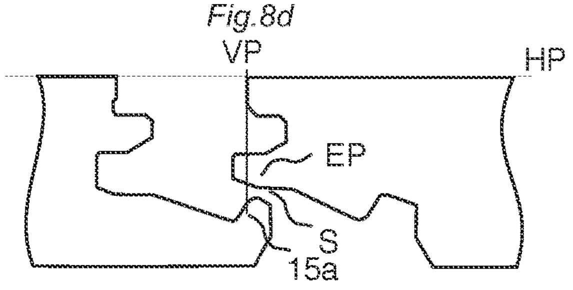

Such edge geometry as shown in FIG. 8*b* makes it possible to divide the board into floor panels with a carving tool, which may have sufficient size in order to divide the board in high speed and with a sufficient accuracy and tool lifetime. FIG. 8*c* show that the overlapping OL of the final machined edge portions may be even larger if the joint geometry is such that the necessary space S above the locking element 8*b* exists on and along the vertical plane VP. An even larger overlapping and cost saving may be reached if the space S exists when the edge part EP is located at the vertical plane VP and vertically above one of the horizontally locking surfaces 15*a* on the locking element 8.

Figure 8E:
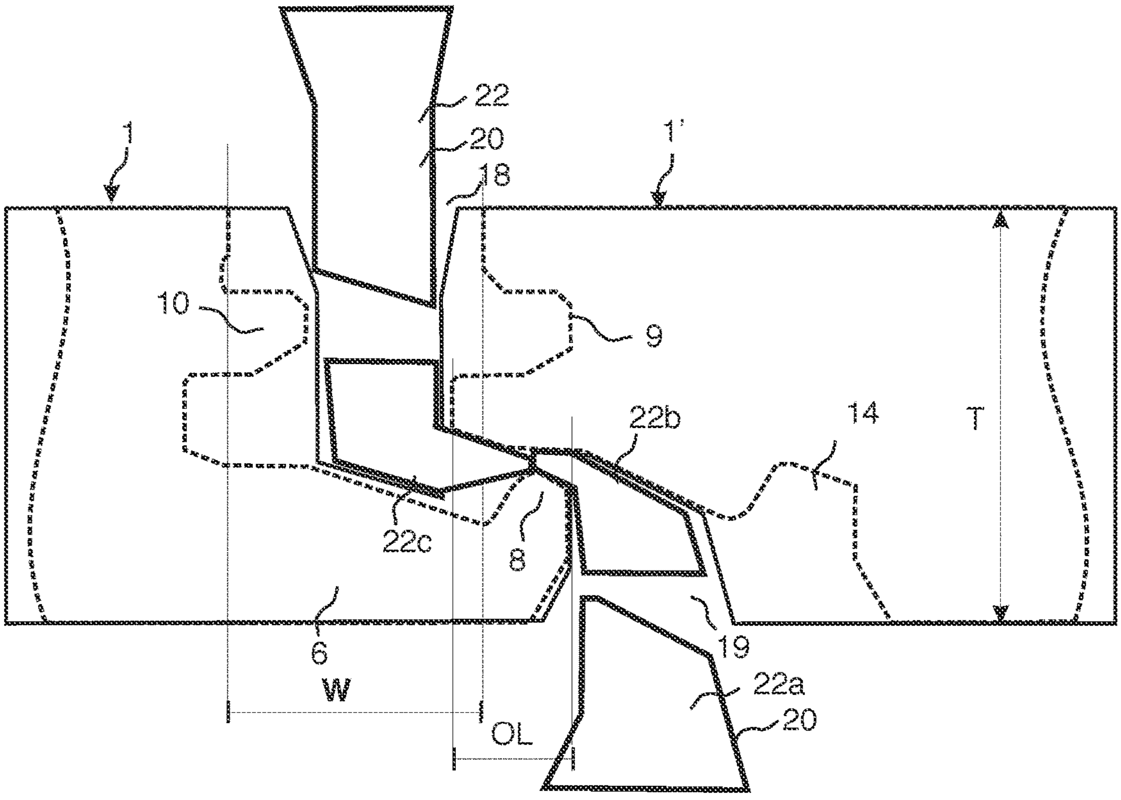

FIG. 8*e* show that the first 19 and/or the second 18 vertically open groove may be formed by a rotating saw blade 20 and/or a carving tool 22. In this preferred embodiment the second vertically groove 18 is formed by a rotating saw blade 20 and the first by a carving tool 22*a*.

It is preferred that second groove 18 is made by sawing by the rotating saw blade 22, and that the first groove 19 is made before the cutting of the second groove 18.

The panels are finally divided by an upper and a lower carving tool 22*c*, 22*b* that are inserted in the pre formed grooves and that forms essentially horizontal grooves.

Such non-linear separation combined with overlapping edges OL may be used to decrease material waste W in all types of locking systems. The material waste W in a laminate floor may be less than the floor thickness T. It is possible to reduce the waste to about 5 mm and less in a laminate floor with a thickness of about 6-12 mm.

The board may be arranged on a carrier, such as a conveyor belt/chain, preferably provided with a pushing device, such as a cam or ridge (not shown). The decorative surface of the board may be arranged against the carrier and facing downwards (not shown). The pushing device may be used to overcome the rather high cutting forces that have to be overcome in order to create a groove with non-rotating carving tools.

Figure 9A:
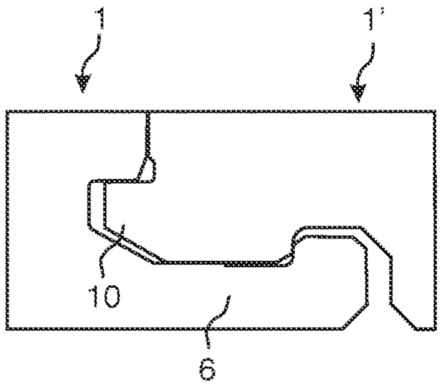
FIGS. 9*a-f* show how conventional locking systems may be adjusted and divided according to embodiments of the invention.
Figure 9B:
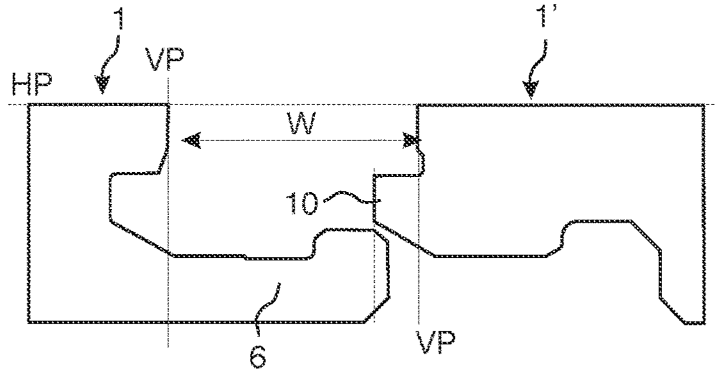
Figure 9C:
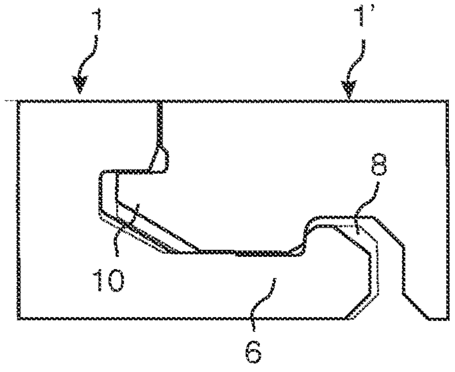
Figure 9D:
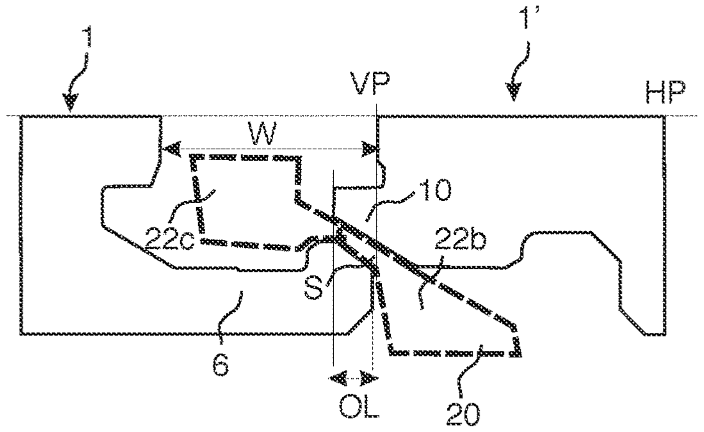
Figure 9E:
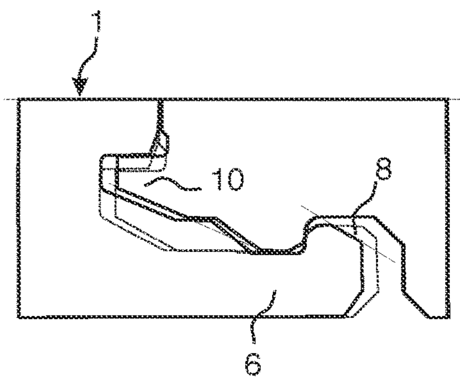
Figure 9F:
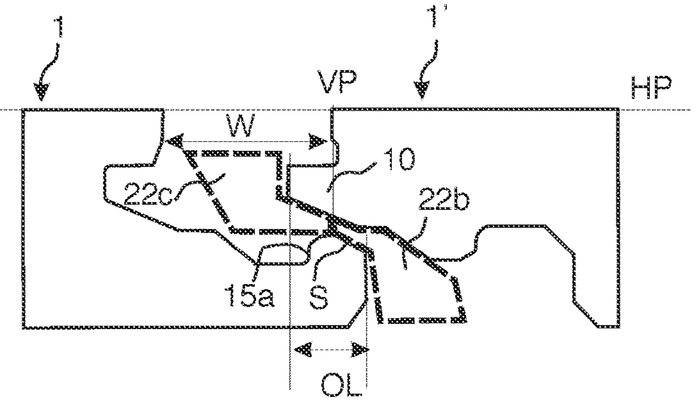

FIG. 9*a*-9*f* show that considerable material waste W savings may be reached with a nonlinear panel separation and with overlapping edges OL even if the tongue 10 is formed on the second edge 1' as in conventional locking systems as shown in FIGS. 9*a*-9*b*. FIG. 9*b* shows that the waste W may be decreased with two offset vertical grooves and with a small carving. FIG. 9*c* shows that it is possible to modify the locking system such that it may be compatible with the old locking system and that an increased overlapping of the edges may be obtained as shown in FIG. 9*d*. A part of the lower part of the tongue 10 and the upper outer part of the locking element 8 may be removed by a small rotating milling tool that may be angled or more preferably by a carving tool such that a space S may be created when the edges 1, 1' are in an overlapped position as described above. It is preferred that the space S is larger above an outer part of the locking element than above the top of the locking element such that a strong and rather large carving tool edge 22*b* may be used to divide the panels. FIG. 9*e*-9*f* show that further cost savings and a larger overlapping may be reached if the tongue 10 is moved upwards.

Figure 10A:
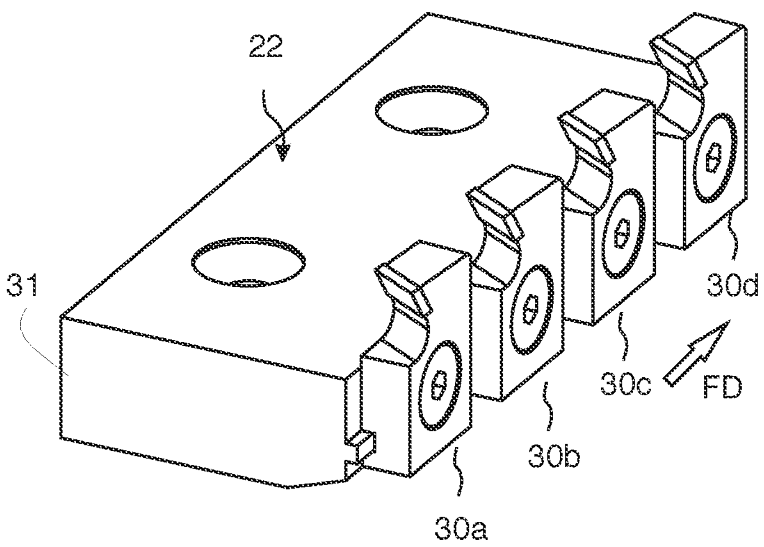
FIGS. 10*a-b* show a carving tool according to an embodiment of the invention.

FIG. 10*a* shows a carving tool with four carving teeth 30*a*-30*d*. The teeth are connected to a tool body 31.

Several methods may be used to increase the production capacity and flexibility.

Each carving tooth may be fixed in an adjustable tool holder. Several carving teeth may be of the same length and the cutting depth may be adjusted by the adjustable tool holder.

To make it possible to change the teeth quickly the tool holders may be attached to a tool body on a rotating disk or other tool cassette systems.

Figure 10B:
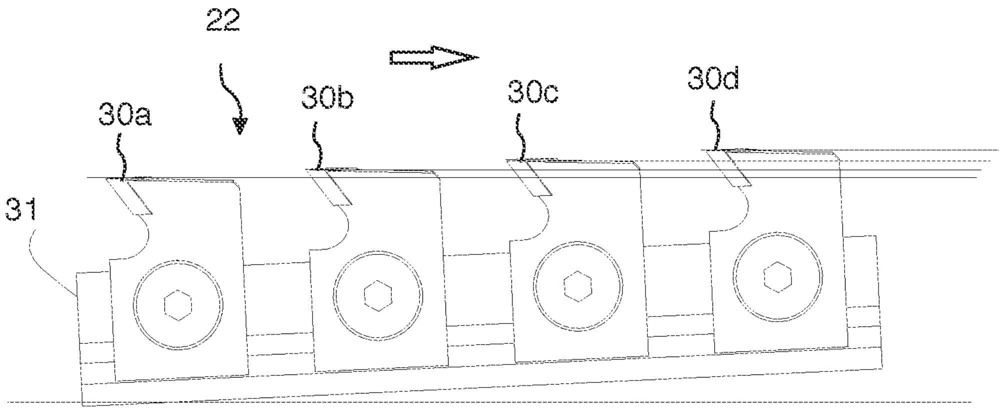

FIG. 10*b* shows that the tool body may be slightly inclined such that each tooth carves a depth of for example 0.2 mm when the panel is displaced in the feeding direction against the fixed carving tool. Each tooth may be designed to carve a distance of for example 0.2-0.6 mm in a wood based core. HDF is especially suitable to be formed with carving.

Figure 11A:
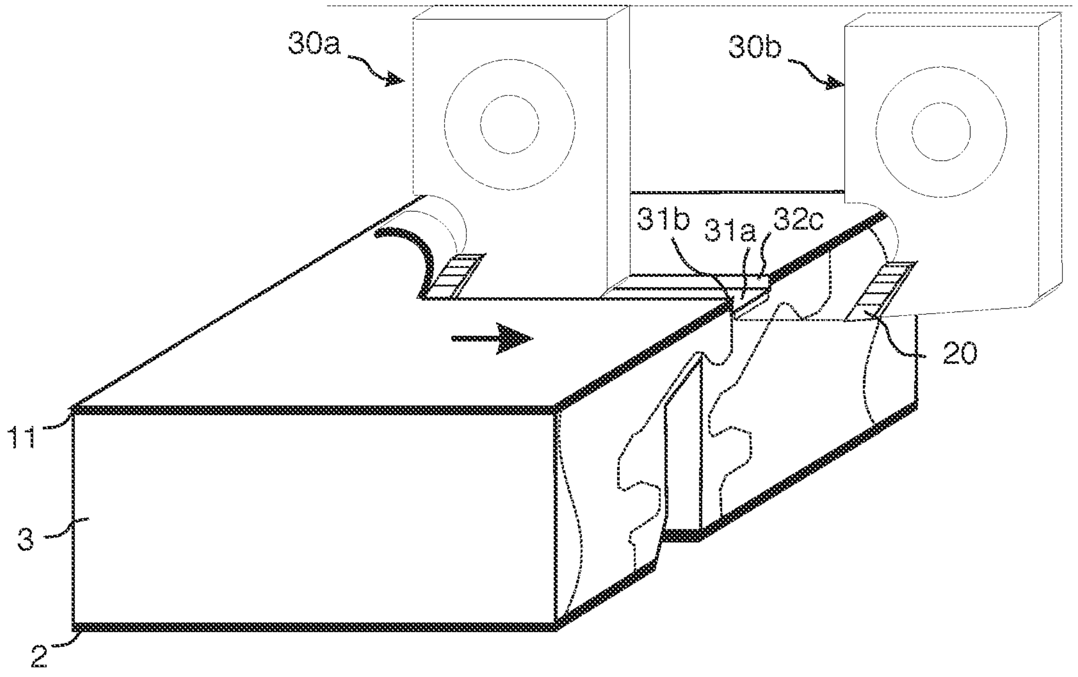
FIGS. 11*a-b* show carving of horizontal and vertical grooves according to embodiments of the invention.

FIG. 11*a* shows how the first tooth 30*a* cuts the first cut under the backing laminate 11. The tooth edges comprise 3 cutting edges that formed the groove bottom 31*a* and two sidewalls 31_b_, 31_c_. It is preferred that the teeth have gradually smaller width along the feeding direction. Slightly V shaped teeth may be used to provide a more accurate cut with reduced chipping of the laminate. This reduces tool wear and the heat that may be created at high feeding speeds.

Figure 11B:
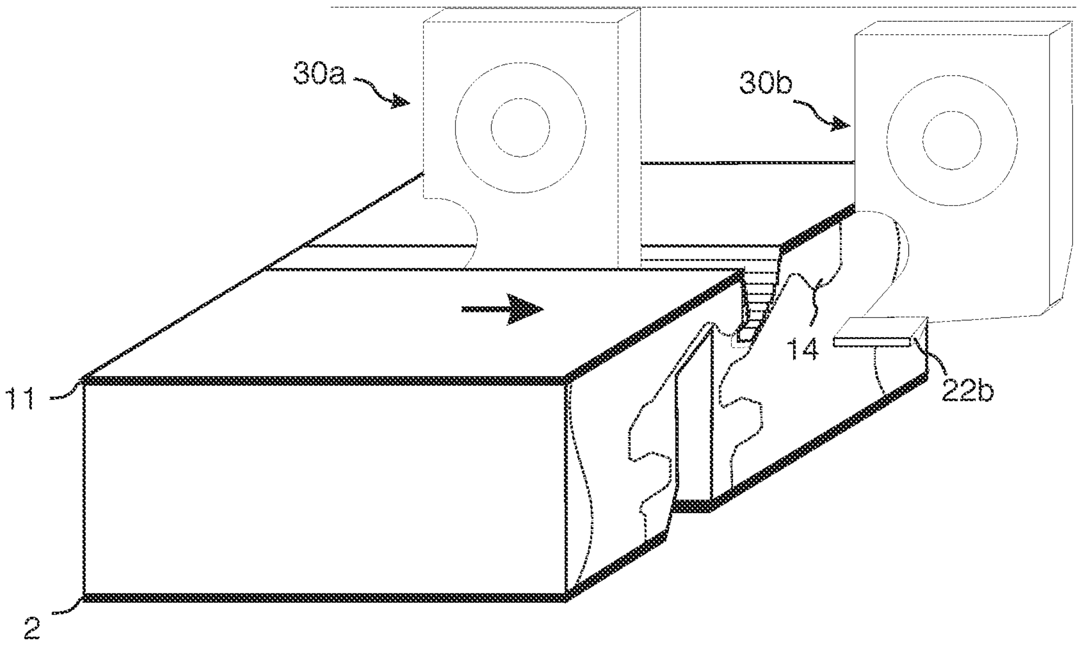

FIG. 11_b_ shows carving of an essentially horizontal groove that provides the final separation. The groove angle in the final groove may vary from zero to 45 degrees against the horizontal plane HP.

The above-described locking systems have been especially design to allow a cost efficient separation of the boards in order to decrease the waste W. As may be seen from the drawings the waste may be reduced considerably. In most application a waste reduction of about 40-50% may be reached compared to conventional production methods.

Embodiments of the invention are especially suitable to be used in solid wood floor where the material cost is high and where a protruding tongue creates a high waste cost. A floor comprising small individual rectangular small size parquet strips with width and length of 10*50 cm or smaller may be produced in a cost very efficient way with considerably lower waste.

Embodiments of the invention may be used to form all types of locking systems on long and/or short edges that may be connected by various combinations of angling, and/or horizontal snapping and/or vertical folding.

Embodiments of the invention are also suitable for panels, such as building panels and floor panels, with a digitally printed surface. The advantage is that it's not required to adjust the printed paper pattern on the board to the size of the panels, produced by the divided board, by an adjustment of the printing cylinder. The forming of the vertical grooves may be formed with thinner tools since the digitally printed surface layer is normally easy to cut. Panels, such as building panels and floor panels, may also be formed without a decorative surface. A decorative surface and a protective layer may be applied by for example digital printing after the locking system is already formed. This method reduces the surface waste to a minimum.

Mechanical locking systems may be formed by rotating tools that generally have a diameter of about 20 cm or more. Rotating tool configurations are driven by tool motors which is a big cost of the total investment in a production line, they are also energy consuming, have a complicated electrical control system, and require a lot of maintenance. Rotating tools produce a lot of dust that have to be extracted. The dust comprises of a mixture of removed ships and dust. A disadvantage of even a sophisticated dust extraction system for rotating tool configurations, is that a fraction of dust and chips that goes in to the transport system and causes wear that effects the precision of the transport system in a negative way. All such problems may be reduced if rotating tools are replaced by carving tools.

It is possible according to embodiments of the invention to separate the panels and to form the completed locking system with a tongue 10, a tongue groove 9, a strip 6, a locking element 8 and a locking groove 14, as shown in FIG. 8_e_ by just using carving tools. Bevels or decorative grooves at the upper edges may also be formed by carving.

Carving prior to the final separation may according to embodiments of the invention form several parts of the locking system or even the whole locking system. Scraping of the top edges with V shaped carving tools may provide a very precise and smooth edge.

It is also possible to form, for example, the locking groove 14 prior to the separation of the panels. The locking groove may in a subsequent production step be used to guide the panels in correct position and this may be used to decrease the overlapping OL further and to save even more material.

EMBODIMENTS

1. A method for dividing a board into a first panel (1) and a second panel (1'), wherein the method comprises the step of displacing the board and dividing the board by a fixed tool (22), such as scraping or carving tool.

2. The method as in embodiment 1, wherein the method comprises the step of forming a first vertically open groove (19), through a rear side of the board and an offset second vertically open groove (19), through the front side of the board.

3. The method as in embodiment 2, wherein the first vertically open groove (18) is formed by a fixed tool or a saw blade.

4. The method as in any one of embodiments 2 or 3, wherein the second vertically open groove (19) is formed by a fixed tool or a saw blade.

5. The method as in any one of the embodiments 2-4, wherein the method comprises the step of forming, by a fixed tool (22_b_), a first horizontally extending groove that extends horizontally under the front side and/or the rear side of the board.

6. The method as in embodiment 5, wherein the first horizontally extending groove extends from the second groove (19) towards the first groove (18).

7. The method as in embodiment 5, wherein the first horizontally extending groove extends from the first groove (18) towards the second groove (19).

8. The method as in any one of the embodiments 5-7, wherein the first horizontally extending groove connects the first vertically open groove and the second vertically open groove.

9. The method as in embodiment 5, wherein the method comprises the step of forming, by a fixed tool (22_b_), a second horizontally extending groove that extends horizontally under the front side and/or rear side of the board, wherein the second horizontally extending groove extends from the second vertically open groove towards the first vertically open groove and the first horizontally extending groove extends from the first vertically open groove towards the second vertically open groove.

10. The method as in embodiment 9, wherein the first horizontally extending grooves is connected with the second horizontally extending grooves.

11. The method as in any one of the embodiments 2-10, wherein the forming of the second vertically open groove (18) is made by sawing by a rotating saw blade (22).

12. The method as in embodiment 11, wherein the forming of the first vertically groove (19) is made before the cutting of the second vertically open groove (18) and wherein the first vertically open groove is made by a fixed tool.

13. The method as in any one of the preceding embodiments, wherein the method comprises the step of arranging the board on a carrier, such as a conveyor belt/chain, preferably provided with a pushing device, such as a cam or ridge.

14. The method as in embodiment 7, comprising the step of arranging the front side of the board against the carrier and facing downwards.

15. The method as in any one of the preceding embodiments, wherein the fixed tool comprises several carving teeth, arranged for forming at different vertical and/or horizontal positions.

16. The method as in any one of the preceding embodiments, wherein the method comprises the step of removing the chips created by the fixed tool by compressed air, preferably by a compressed air nozzle, and preferably collected by a suction device.

17. The method as in any one of the preceding embodiments, wherein the board is a laminated board, such as a floor element (1*b*).

18. The method as in embodiment 17, wherein the laminated board comprises a core (3) provided with a decorative surface layer (2) and a balancing layer.

19. The method as in embodiment 18, comprising the step of removing the chips created by the forming, preferably by several compressed air nozzles, and preferably sorting and disposing into separate containers the chips from the core and the balancing layer and/or the decorative layer.

20. A method of forming a mechanical locking system for locking of a first and a second panel, wherein the method comprises the steps:

dividing a board into a first and a second panel according to the method as in any one of the embodiments 1-19 and thereby forming a lower protruding part at a first edge of the first panel and a lower groove at a second edge of the second panel;

forming a locking element (8) at the lower protruding part;

and forming a locking groove (14) at the lower groove.

21. Building panels, each comprising an upper surface (2) and a core (3), provided with a locking system for vertical and horizontal locking of a first edge of a first building panel (1) to an adjacent second edge of a second building panel (1'), wherein upper parts of the first and the second edge in a locked position together define a vertical plane (VP), which is perpendicular to a horizontal plane (HP), which is parallel to the upper surface (2) of the first and the second building panel (1, 1'), said locking system is configured to enable assembling of the first and the second edge by angling the first and the second building panel (1, 1') relative each other, the locking system comprises a tongue (10), made in one piece with said core (3), and a tongue groove (9) configured to cooperate for vertical locking, and a strip (6), made in one piece with the core, which is provided with a locking element (8) configured to cooperate for horizontal locking with a downwardly open locking groove (14) formed in the second edge (1'), the edges (1, 1') can obtain a relative position with a distance between the first and the second edge, characterized in that in said position the upper surface (2) of the first and the second building panel (1, 1'), are in the same horizontal plane (HP), that an edge part (EP) of the second edges is located vertically above the upper part of the locking element (8), and that there is a vertically extending space S of at least about 0.5 mm between the locking element and all parts of the second which edge, which is located above the locking element.

22. The building panels as in embodiment 21, wherein the edge part (EP) is located at the vertical plane (VP).

23. The building panels as in embodiment 21 or 22, wherein the locking element (8) comprises a locking surface (15*a*) that cooperates with a locking surface at the locking groove (14) for horizontal locking and wherein the edge part (EP) is located vertically above the locking surface (15*a*) of the locking element.

24. The building panels as in any one of the preceding embodiments 21-23, wherein the space S is larger than 0.6 mm.

25. The building panels as any one of the preceding embodiments 21-25, wherein the space S is equal or larger above the outer part of the locking element than above the upper part of the locking element.

26. The building panels as in any one of the preceding embodiments 21-25, wherein the edge portion EP comprises a lower part that is inclined downwards and inwardly.

27. The building panels as in any one of the preceding embodiments 21-26, wherein the edge part comprises a lower part of the tongue (10)

28. The building panels as in in any one of the preceding embodiments 21-28 wherein the building panel is a floor board.

29. Building panels, comprising a surface (2) and a core (3), provided with a locking system for vertical and horizontal locking of a first edge of a first building panel (1) to an adjacent second edge of a second building panel (1'), wherein upper parts of the first and the second edge in a locked position together define a vertical plane (VP) perpendicular to a horizontal plane (HP), which is parallel to the surface (2), said locking system is configured to enable assembling of the first and the second edge by angling the first and the second building panel (1, 1') relative each other, the locking system comprises a tongue (10), made in one piece with said core (3), and a tongue groove (9) configured to cooperate for vertical locking, the first edge (1) comprises a strip, made in one piece with the core, which is (6) provided with a locking element (8), which is configured to cooperate for horizontal locking with a downwardly open locking groove (14), which is formed in the second edge (1'), characterized in that:

the tongue, which is provided on the first edge, cooperates with a lower lip (9*a*) of the tongue groove (9), which is provided at the second edge, at lower vertically locking surfaces (13), that the locking element (8) and the locking groove (14) cooperate at horizontally locking surfaces (15), that the tongue (10) protrudes outwardly beyond the vertical plane (VP), that the tongue groove (9) comprises an upper lip (9*b*), and that the horizontal extension (LE) of the lower lip (9*a*), in relation to the upper lip (9*b*), is smaller than the horizontal extension (TE) of the tongue (10).

30. The building panels as in embodiment 29, wherein the cooperating horizontally locking surfaces (15) lock the edges both horizontally and vertically with horizontal (P1) and vertical (P2) pre tension.

31. The building panels as in embodiment 29 or 30, wherein the tongue (10) cooperates with the upper lip (9*b*) at upper vertically locking surfaces (12).

32. The building panels as in any one of the preceding embodiments 35-37, wherein the tongue (10) and the tongue groove (9) comprises upper (12) and lower (13) vertically locking surfaces that are essentially parallel with the horizontal plane (HP) and offset horizontally such that a part of the upper vertically locking surfaces (12) are horizontally closer to the locking element (8) than the lower vertically locking surfaces (13).

33. The building panels as any one of the preceding embodiments 29-32, wherein the lower lip (9*a*) protrudes beyond the upper lip (9*b*) and the vertical plane (VP).

34. The building panels as in any one of the preceding embodiments 29-33, wherein the horizontal extension (TE)

of the tongue (10) is at least about twice as large as the horizontal extension (LE) of the lower lip (9*a*).

35. The building panels as in any one of the preceding embodiments 29-34, wherein the tongue (10) and the tongue groove (9) comprise guiding surfaces (17*a*, 17*b*) that are configured to be in contact with each other, during the assembling by angling, when an edge part (EP) of the second edge (1') is in contact with the strip (6) and/or the locking element (8).

36. The building panels as in any one of embodiments 29-35, wherein the guiding surfaces (17*a* 17*b*) are inclined relative the vertical plane (VP) and located on the upper and/or lower parts of the tongue (10) and the tongue groove (9)

37. The building panels as in any one of the preceding embodiments 29-35, wherein the horizontal locking surfaces are located below a horizontal strip plane (HPS) that intersects an upper part (6*a*) of the strip (6), which is located essentially vertically under the outer part of the tongue (10)

38. The building panels as in any one of the preceding embodiments 29-37, wherein the horizontal locking surfaces are located both below and above the horizontal strip plane.

39. The building panels as in any one of the preceding embodiments 29-38, wherein the horizontal locking surfaces are located above the horizontal strip plane.

40. The building panels as in any one of the preceding embodiments 29-39, wherein the locking system comprises a space (S) between the upper part of the strip (6) and an edge portion (EP) of the second panel (1') located essentially under the tongue (10).

41. The building panels as in any one of the preceding embodiments 29-40, wherein the upper vertically locking surfaces are offset horizontally in relation to the horizontally locking surfaces.

42. The building panels as in any one of the preceding embodiments 29-42, wherein the vertically and horizontally locking surfaces are offset horizontally with a horizontal distance (D) that is larger than the horizontal extension (TE) of the tongue (10).

43. The building panels as in any one of the preceding embodiments 29-42, wherein the core comprises HDF, particle board, plastic or plywood material.

44. The building panels as in any one of the preceding embodiments 29-43, wherein the horizontally locking surfaces (15) have a locking angle of about 40-60 degrees against the horizontal plane (HP).

The invention claimed is:

1. Building panels including a first building panel and a second building panel, each comprising an upper surface and a core, provided with a locking system for vertical and horizontal locking of a first edge of the first building panel to an adjacent second edge of the second building panel, wherein, in a locked position of the first and second building panels, upper parts of the first edge and the second edge together define a vertical plane, which is perpendicular to a horizontal plane, which is parallel to the upper surfaces of the first building panel and second building panel, said locking system being configured for assembling the first edge and the second edge by angling the first building panel and second building panel relative to each other, wherein the locking system comprises a tongue and a tongue groove configured to cooperate for vertical locking, and a strip comprising a locking element configured to cooperate with a downwardly open locking groove formed in the second edge for horizontal locking, in the locked position, all horizontal locking against separation of the first and second building panels in the locked position being provided by the locking element cooperating with the downwardly open locking groove, wherein, horizontally outside of the vertical plane, at least a portion of an upper part of the strip extends in parallel with a front side of the first panel, wherein, in the locked position of the first and second building panels, an uppermost edge of the core of the first building panel abuts an uppermost edge of the core of the second building panel, and wherein the first edge and the second edge are configured to be positioned relative to one another, in an unlocked position of the first and second building panels, with a horizontal space between the first edge and the second edge such that:

the upper surfaces of the first building panel and the second building panel are provided in the same horizontal plane;

an edge part of the second edge is located vertically above an upper part of the locking element; and a vertical space exists between the locking element and all parts of the second edge located above the locking element.

2. The building panels according to claim 1, wherein the vertical space extends at least about 0.5 mm in a vertical direction.

3. The building panels according to claim 1, wherein the vertical space extends more than 0.6 mm in a vertical direction.

4. The building panels according to claim 1, wherein the vertical space above the locking element is vertically aligned with the upper part of the second edge.

5. The building panels according to 1, wherein the locking element comprises a locking surface configured to cooperate with a locking surface at the locking groove for horizontal locking, and wherein the vertical space exists when the first and second building panels are arranged such that the edge part is vertically aligned with the upper part of the second edge and is vertically above the locking surface of the locking element.

6. The building panels according to claim 1, wherein a first total extent of the vertical space above an outermost part of the locking element is larger than or equal to a second total extent of the vertical space above an uppermost part of the locking element.

7. The building panels according to claim 1, wherein the tongue and the strip are formed in one piece with a core of the first building panel.

8. The building panels according to claim 1, wherein the edge part comprises a lower part that is inclined downwards and inwardly.

9. The building panels according to claim 1, wherein the tongue is provided in the first edge and wherein the tongue groove is provided in the second edge, the tongue groove comprising a lower lip and an upper lip.

10. The building panels according to claim 9, wherein the edge part comprises a lower part of the lower lip.

11. The building panels according to claim 9, wherein a difference between a horizontal extension of the lower lip and a horizontal extension of the upper lip is smaller than a horizontal extension of the tongue.

12. The building panels according to claim 9, wherein the lower lip protrudes beyond the upper lip and the vertical plane in the locked position.

13. The building panels according to claim 1, wherein the tongue protrudes beyond the vertical plane in the locked position.

14. The building panels according to claim 1, wherein the tongue and the tongue groove comprise guiding surfaces configured to be in contact with each other during the assembling by angling, when the edge part is in contact with the strip and/or the locking element.

15. The building panels according to claim 1, wherein the vertical space is a first vertical space, and wherein, in the locked position, a second vertical space exists between the edge part of the second edge and an upper part of the strip that is offset from the locking element.

16. The building panels according to claim 1, wherein the building panels are floorboards.

17. The building panels according to claim 1, wherein a core of the building panels comprises HDF, particleboard, plastic or plywood material.

18. Building panels including a first building panel and a second building panel, each comprising an upper surface and a core, provided with a locking system for vertical and horizontal locking of a first edge of the first building panel to an adjacent second edge of the second building panel, wherein, in a locked position of the first and second building panels, upper parts of the first edge and the second edge together define a vertical plane, which is perpendicular to a horizontal plane, which is parallel to the upper surfaces of the first building panel and second building panel, said locking system being configured for assembling the first edge and the second edge by angling the first building panel and second building panel relative to each other, wherein the locking system comprises a tongue and a tongue groove configured to cooperate for vertical locking, and a strip comprising a locking element configured to cooperate with a downwardly open locking groove formed in the second edge for horizontal locking, in the locked position, wherein the tongue is provided in the first edge and wherein the tongue groove is provided in the second edge, wherein the first edge and the second edge are configured to be positioned relative to one another, in an unlocked position of the first and second building panels, with a horizontal space between the first edge and the second edge such that:

the upper surfaces of the first building panel and the second building panel are provided in the same horizontal plane;

an edge part of the second edge is located vertically above an upper part of the locking element; and a vertical space exists between the locking element and all parts of the second edge located above the locking element, and wherein the tongue and the tongue groove comprise upper and lower vertically locking surfaces that are essentially parallel with the horizontal plane and offset horizontally such that in the locked position a part of the upper vertically locking surfaces is horizontally closer to the locking element than the lower vertically locking surfaces.

19. Building panels including a first building panel and a second building panel, each comprising an upper surface and a core, provided with a locking system for vertical and horizontal locking of a first edge of the first building panel to an adjacent second edge of the second building panel, wherein, in a locked position of the first and second building panels, upper parts of the first edge and the second edge together define a vertical plane, which is perpendicular to a horizontal plane, which is parallel to the upper surfaces of the first building panel and second building panel, said locking system being configured for assembling the first edge and the second edge by angling the first building panel and second building panel relative to each other, wherein the locking system comprises a tongue and a tongue groove configured to cooperate for vertical locking, and a strip comprising a locking element configured to cooperate with a downwardly open locking groove formed in the second edge for horizontal locking, in the locked position, wherein the tongue is provided in the first edge and wherein the tongue groove is provided in the second edge, wherein the first edge and the second edge are configured to be positioned relative to one another, in an unlocked position of the first and second building panels, with a horizontal space between the first edge and the second edge such that:

the upper surfaces of the first building panel and the second building panel are provided in the same horizontal plane;

an edge part of the second edge is located vertically above an upper part of the locking element; and a vertical space exists between the locking element and all parts of the second edge located above the locking element, and wherein horizontal locking surfaces of the locking system are located below a horizontal strip plane intersecting an upper part of the strip, which is located vertically under an outer part of the tongue.

* * * * *